United States Patent
Kutsumi et al.

(10) Patent No.: US 7,890,653 B2
(45) Date of Patent: *Feb. 15, 2011

(54) OPERATION HISTORY UTILIZATION SYSTEM

(75) Inventors: Hiroshi Kutsumi, Moriguchi (JP); Shouichi Araki, Osaka (JP); Atsushi Yoshida, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1425 days.

This patent is subject to a terminal disclaimer.

(21) Appl. No.: 10/556,799

(22) PCT Filed: Apr. 21, 2004

(86) PCT No.: PCT/JP2004/005695
§ 371 (c)(1), (2), (4) Date: Nov. 15, 2005

(87) PCT Pub. No.: WO2004/104881
PCT Pub. Date: Dec. 2, 2004

(65) Prior Publication Data
US 2007/0011195 A1 Jan. 11, 2007

(30) Foreign Application Priority Data
May 26, 2003 (JP) .............................. 2003-147962

(51) Int. Cl.
*G06F 15/173* (2006.01)
(52) U.S. Cl. .................................................... 709/238
(58) Field of Classification Search .................. 709/238
See application file for complete search history.

(56) References Cited

U.S. PATENT DOCUMENTS 4,905,080 A 2/1990 Watanabe et al.

(Continued)

FOREIGN PATENT DOCUMENTS

EP 1 065 614 1/2001

(Continued)

OTHER PUBLICATIONS

Yamazaki Michhiro Method for Automating Routine Processing Based on Operation Monitoring Pages.*

(Continued)

*Primary Examiner*—Karen C Tang
(74) *Attorney, Agent, or Firm*—Wenderoth, Lind & Ponack, L.L.P.

(57) ABSTRACT

A user agent unit includes an pattern extracting unit which extracts a frequent operation pattern of the log data that fulfills predetermined conditions from the operation log data registered in the operation log data database a pattern database which memorizes the frequent operation pattern; a pattern monitoring unit which monitors an operation pattern, from the operation log data to be newly registered, that correspond with the frequent operation pattern registered in the pattern database; and a pattern classifying unit which specifies the operator of the frequent operation pattern memorized in the pattern database.

9 Claims, 33 Drawing Sheets

| Operation type | Operation type identifier |
|---|---|
| Power ON | PowerOn |
| Power Off | PowerOff |
| Operation 1 | Opr1 |
| Operation 2 | Opr2 |
| Operation 3 | Opr3 |
| Operation 4 | Opr4 |
| Operation 5 | Opr5 |
| ... | ... |

U.S. PATENT DOCUMENTS

| | | | |
|---|---|---|---|
| 5,630,159 | A | 5/1997 | Zancho |
| 5,896,539 | A | 4/1999 | Arimilli et al. |
| 6,182,055 | B1 | 1/2001 | Kase et al. |
| 6,353,764 | B1 | 3/2002 | Imagawa et al. |
| 6,400,996 | B1 * | 6/2002 | Hoffberg et al. ............... 700/83 |
| 6,469,751 | B1 | 10/2002 | Isobe et al. |
| 2001/0052862 | A1 * | 12/2001 | Roelofs ...................... 340/999 |
| 2002/0059584 | A1 | 5/2002 | Ferman et al. |
| 2003/0101449 | A1 | 5/2003 | Bentolila et al. |
| 2003/0101451 | A1 | 5/2003 | Bentolila et al. |
| 2004/0034638 | A1 * | 2/2004 | Brown et al. .................. 707/10 |

FOREIGN PATENT DOCUMENTS

| | | |
|---|---|---|
| EP | 1 083 508 | 3/2001 |
| JP | 63-294091 | 11/1988 |
| JP | 05-020261 | 1/1993 |
| JP | 06-078094 | 3/1994 |
| JP | 7-42238 | 7/1995 |
| JP | 07-230446 | 8/1995 |
| JP | 07-234861 | 9/1995 |
| JP | 08-046587 | 2/1996 |
| JP | 08-046588 | 2/1996 |
| JP | 08-272475 | 10/1996 |
| JP | 10-161877 | 6/1998 |
| JP | 10-307748 | 11/1998 |
| JP | 11-327753 | 11/1999 |
| JP | 2000-175136 | 6/2000 |
| JP | 2000-293540 | 10/2000 |
| JP | 2000-324246 | 11/2000 |
| JP | 2001-014247 | 1/2001 |
| JP | 2001-036981 | 2/2001 |
| JP | 2001-134706 | 5/2001 |
| JP | 2002-099503 | 4/2002 |
| JP | 2002-175405 | 6/2002 |
| JP | 2002-184157 | 6/2002 |
| JP | 2002-251370 | 9/2002 |
| JP | 2002-281574 | 9/2002 |
| JP | 2002-333826 | 11/2002 |
| JP | 2003-018584 | 1/2003 |
| JP | 2003-099458 | 4/2003 |
| JP | 2003-111157 | 4/2003 |
| JP | 2003-130649 | 5/2003 |

OTHER PUBLICATIONS

Katsunori Matsuoka, "Personal Supporting System for Daily Life by Monitoring Human Behaviors in a House", *Systems, Control and Information*, vol. 46, No. 8, pp. 32-37, Aug. 15, 2002. (English Translation).

R & D Project on New Industrial Science and technology Frontiers; "Behavior-Based Human Environment Creation Technology"; New Energy and Industrial Technology Development Organization, Research Institute of Human Engineering for Quality Life; Oct. 2002.

* cited by examiner

| Operation type | Operation type identifier |
|---|---|
| Power ON | PowerOn |
| Power Off | PowerOff |
| Operation 1 | Opr1 |
| Operation 2 | Opr2 |
| Operation 3 | Opr3 |
| Operation 4 | Opr4 |
| Operation 5 | Opr5 |
| ... | ... |

FIG. 4

| Operation date | Operation type identifier | Argument |
|---|---|---|
| 2002/08/30 21:00 | Power_On | |
| 2002/08/30 21:00 | Opr1 | |
| 2002/08/30 21:01 | Opr4 | |
| 2002/08/30 21:46 | Opr3 | |
| 2002/08/30 22:55 | Opr2 | |
| 2002/08/30 22:57 | Opr5 | |
| 2002/08/30 22:58 | Power_Off | xxxxxxxxabc |
| ... | ... | ... |
| 2002/08/31 20:56 | Power_On | |
| 2002/08/31 21:00 | Opr1 | |
| 2002/08/31 21:00 | Opr4 | |
| 2002/08/31 21:55 | Opr2 | |
| 2002/08/31 21:56 | Power_Off | xxxxxxxxabc |
| ... | | ... |

Columns: 1001, 1002, 1003, 1004, 1005

FIG. 6

| Episode | Operation sequence |
|---|---|
| 1001 | PowerOn, Opr1, Opr4 |
| 1002 | Opr3 |
| 1003 | Opr2, Opr5, PowerOff |
| 1004 | PowerOn, Opr1, Opr4 |
| 1005 | Opr2, PowerOff |

FIG. 7

| No | Frequent operation pattern |
|---|---|
| 1 | PowerOn, Opr1, Opr4 |
| 2 | Opr2, PowerOff |
| 3 | Opr8, Opr2, Opr3 |
| 4 | Opr7, Opr6, Opr10 |
| 5 | Opr4, Opr8 |
| 6 | Opr8, Opr2, Opr5 |

FIG. 8

| User | Deterministic operation |
|---|---|
| A | Opr5 |
| B | Opr3 |
| C | PowerOff |
| D | Opr1 |
| ... | ... |

FIG. 10

| No | Frequent operation pattern | Operator |
|----|---------------------------|----------|
| 1  | PowerOn, Opr1, Opr4       | D        |
| 2  | Opr2, PowerOff            | C        |
| 3  | Opr8, Opr2, Opr3          | B        |
| 4  | Opr7, Opr6, Opr10         | C=0.6 B=0.15 |
| 5  | Opr4, Opr8                | C=0.3 B=0.075 |
| 6  | Opr8, Opr2, Opr5          | A        |

FIG. 11

| User | Deterministic operation | Confidence degree |
|---|---|---|
| A | Opr5 | 0.8 |
| B | Opr3 | 0.7 |
| C | PowerOff | 0.6 |
| D | Opr1 | 0.8 |
| ... | ... | ... |

FIG. 18A

| User | Priority order |
|---|---|
| A | 3 |
| B | 1 |
| C | 4 |
| D | 2 |
| ... | ... |

FIG. 18B

| Operation | Priority order |
|---|---|
| PowerOn | 1 |
| PowerOff | 6 |
| Opr1 | 2 |
| Opr2 | 5 |
| ... | ... |

FIG. 18C

| Operation | Alternate operation |
|---|---|
| PowerOn | - |
| PowerOff | - |
| Opr1 | Opr4 |
| Opr5 | Opr13 |
| ... | ... |

FIG. 21A

| User | Distribution probability |
|---|---|
| A | 0.2 |
| B | 0.1 |
| C | 0.3 |
| D | 0.1 |
| ... | ... |

FIG. 21B

| Operation | Distribution probability |
|---|---|
| PowerOn | 0.3 |
| PowerOff | 0.1 |
| Opr1 | 0.2 |
| Opr2 | 0.2 |
| ... | ... |

FIG. 25

|   | Performance |
|---|---|
| 1 | Perform operation user did |
| 2 | Perform operation predicted from frequent operation pattern |
| 3 | After performing operation user did, return |

FIG. 29

| Device type | Operation type | Operation type identifier |
|---|---|---|
| TV | Power ON | PowerOn |
| | Power Off | PowerOff |
| | Volume Up | VolUp |
| | Volume Down | VolDown |
| | Channel change | Play |
| | ... | ... |
| VIDEO | Power ON | PowerOn |
| | Power Off | PowerOff |
| | Play | Play |
| | Stop | Stop |
| | Record | Record |
| | Reserve | Reserve |
| | ... | ... |
| Air Conditioner | Power ON | PowerOn |
| | Power Off | PowerOff |
| | Temperature setting | Set |
| | Air volume setting | Set |
| | Stop | Stop |
| | Reserve | Reserve |
| | ... | ... |
| ... | ... | ... |

| Operation date | Device type | Operation type identifier | Argument |
|---|---|---|---|
| 2002/08/29 11:00 | Air Conditioner | Set | 27 |

(B)

| Operation date | Device type | Operation type identifier | Argument |
|---|---|---|---|
| 2002/08/30 18:00 | TV | Play | ID:XXXXXX |

FIG. 31

| Operation date | Device type | Operation type identifier | Argument |
|---|---|---|---|
| 2002/08/30 21:00 | TV | Power_On | |
| 2002/08/30 21:00 | TV | Play | xxxxxxxx04 |
| 2002/08/30 21:01 | AirConditioner | Power_On | |
| 2002/08/30 21:46 | Video | Reserve | xxxxxxxx09 |
| 2002/08/30 22:55 | TV | Power_Off | |
| 2002/08/30 22:57 | AirConditioner | Power_Off | |
| 2002/08/30 22:58 | MD | Play | xxxxxxxabc |
| ... | ... | ... | ... |
| 2002/08/31 20:56 | TV | Power_On | |
| 2002/08/31 21:00 | TV | Play | xxxxxxxx04 |
| 2002/08/31 21:00 | AirConditioner | Power_On | |
| 2002/08/31 21:55 | TV | Power_Off | |
| 2002/08/31 21:56 | MD | Play | xxxxxxxabc |
| ... | | ... | ... |

| Episode | Operation sequence |
|---|---|
| 2001 | TV-PowerOn, TV-Play, AirConditioner-PowerON |
| 2002 | Video-Reserve |
| 2003 | TV-PowerOff, AirConditioner-PowerOff, MD-Play |
| 2004 | TV-PowerOn, TV-Play, AirConditioner-PowerON |
| 2005 | TV-PowerOff, MD-Play |

FIG. 33

| No | Frequent operation pattern |
|---|---|
| 1 | TV-PowerOn, TV-Play, AirConditioner-PowerON |
| 2 | TV-PowerOff, MD-Play |

FIG. 34

| User | Deterministic operation |
|---|---|
| A | TV-PowerOn |
| B | MD-Play |
| C | AirConditioner-PowerOff |
| D | Video-Reserve |
| ... | ... | ically suggested. For
OPERATION HISTORY UTILIZATION SYSTEM

BACKGROUND OF THE INVENTION

1. Technical Field

The present invention relates to an operation log data management system for providing a user with an appropriate information service by effectively using operational log data of a plurality of devices.

2. Background Art

As a technology to predict a user's behavior, in particular, a method to utilize mobile log data for marketing or information recommendation has been conventionally suggested. For example, there is a method for recording a user's mobile log data by information terminal provided with a Personal Handyphone System (PHS) or a cell phone function, predicting the user's behavior from the mobile log data, and transmitting, to the information terminal, information according to the predicted behavior via a PHS network or a cell phone network (for example, refer to Japanese Laid-Open Patent publication No. 2000-293540 and Japanese Laid-Open Patent publication No. 2000-324246).

However, the conventional technology has targeted a single device such as collecting mobile log data of a cell phone between base stations. Networking of devices is predicted to develop even more in the future. Thus, it is necessary to integrate various log data information from a plurality of devices which belong to a user and to utilize the log data information, via the network, for marketing research such as analysis of the user's preference or a content recommendation service.

Also, a context aware service which provides a service according to the context, using information which is analysis of a user's preference or state based on various log data information, or a service which reflects individual preference, interest, concern and usage (hereinafter referred to as life characteristics in general) even more is needed.

SUMMARY OF INVENTION

The object of the present invention, in view of the above mentioned problem, is to provide an operation log data management system that can provide a service associated with the situation and a service reflecting characteristics of each individual's life.

In order to achieve such object as described above, the operation log data management system according to the present invention comprises: (i) at least one device, (ii) an operation log data management apparatus which manages operation log data transmitted by the device, and (iii) a service providing apparatus which determines a service associated with a user's behavior based on the operation log data managed by said operation log data management apparatus and provides the determined service to said device, which are connected to each other, wherein said operation log data management apparatus includes: a pattern extracting unit operable to extract a frequent operation pattern which is an operation sequence from the operation log data transmitted by said device; a pattern monitoring unit operable to monitor whether or not the operation sequence of operation log data newly transmitted by said device corresponds with the frequent operation pattern; and a pattern classifying unit operable to specify an operator of the frequent operation pattern, and said service providing apparatus includes a service determining unit operable to determine a service associated with a user's behavior based on the monitoring results of said pattern monitoring unit, the frequent operation pattern and the operator of the frequent operation pattern.

Thus, operation log data of each device can be collected, and such operation log data as described above can be integrally managed. Therefore, it is possible to specify which user performed a frequent operation pattern without including a means for directly identifying a user such as an identification device. Also, by specifying a user as described above, a delicate service associated with the user such as outputting information according to the user can be provided.

Here, it is desirable that the pattern classifying unit specifies the first frequent operation pattern, as the operation performed by the operator associated with the deterministic operation, said first frequent operation being a frequent operation pattern including a deterministic operation associated with the predetermined operator, in the frequent operation pattern.

Also, the pattern classifying unit may specify the operator of the second frequent operation that is a frequent operation pattern other than the first frequent operation pattern in the frequent operation pattern, based on the statistic frequency of chain occurrence for the first frequent operation pattern obtained from the operation log data transmitted by the above mentioned device in the past.

In addition, the pattern classifying unit may specify the first frequent operation pattern, as the operation performed by the operator associated with the deterministic operation, said first frequent operation being a frequent operation pattern including the deterministic operation associated with the predetermined operator, in the frequent operation pattern included in the operation log data, newly transmitted from the above mentioned device.

Moreover, the pattern classifying unit may specify the operator of the second frequent operation pattern that is a frequent operation pattern other than the first frequent operation pattern, in the frequent operation pattern included in the operation log data newly transmitted, based on the degree of adjacency between the first frequent operation pattern and the second frequent operation pattern occurring after the first frequent operation pattern.

Thus, based on the operation log data and the deterministic operation information, it is possible to specify which user performed the frequent operation pattern.

Furthermore, the operation log data management system according to the present invention comprises: (i) at least one device, (ii) an operation log data management apparatus which manages operation log data transmitted by the device, and (iii) a service providing apparatus which determines a service associated with a user's behavior based on the operation log data managed by said operation log data management apparatus and provides the determined service to said device, which are connected to each other, wherein said operation log data management apparatus includes: a pattern extracting unit operable to extract a frequent operation pattern from the operation log data transmitted by said device; a pattern monitoring unit operable to monitor whether or not an operation sequence of operation log data newly transmitted by said device corresponds with the frequent operation pattern, and said service providing apparatus includes: a service determining unit operable to determine a service associated with a user's behavior based on the monitoring results of said pattern monitoring unit, and the frequent operation pattern; and a service selecting unit operable to (i) judge whether or not a plurality of services can be simultaneously provided in the case where the services determined by said service determining unit exist more than one in number, and (ii) select a service to be provided, from among the plurality of services, in the case where as a result of the judgment, the plurality of services cannot be provided simultaneously.

Thus, even in the case where a plurality of candidates for a service to be provided exist, but cannot be simultaneously provided, an appropriate service can be selected and provided.

Here, the service selecting unit may select a service based on the predetermined priority order of the user.

Also, the service selecting unit may select a service based on the predetermined priority order of the operation.

In addition, the service selecting unit may select a service based on the predetermined distribution probability of the user.

Moreover, the service selecting unit may select a service based on the predetermined distribution probability of the operation.

Furthermore, the operation log data management system according to the present invention comprises: (i) at least one device, (ii) an operation log data management apparatus which manages operation log data transmitted by the device, and (iii) a service providing apparatus which determines a service associated with a user's behavior based on the operation log data managed by said operation log data management apparatus and provides the determined service to said device, which are connected to each other, wherein said operation log data management apparatus includes: a pattern extracting unit operable to extract a frequent operation pattern from the operation log data transmitted by said device; a pattern monitoring unit operable to monitor whether or not an operation sequence of operation log data newly transmitted by said device corresponds with the frequent operation pattern; and an operation confirming unit operable to confirm or correct an operation predicted as an operation the user does not intend, based on the monitoring results of said pattern monitoring unit.

Therefore, the operation partially deviating from the frequent operation pattern is detected, and an alert about the operation is issued to the operator. Then, the operation is aborted, or an alternate operation predicted from the frequent operation pattern is performed. Thus, the operator's error operation or unintended operation can be prevented by confirming and correcting the operation.

Here, as the monitoring results of said pattern monitoring unit, in the case where the operation sequence of the operation log data, that is newly transmitted by said device, partially corresponds with the frequent operation pattern said operation confirming unit predicts an operation in the operation sequence of the operation log data, as an operation which the user does not intend, said operation not corresponding with the frequent operation pattern that partially corresponds with the operation sequence.

Also, the operation log data management apparatus according to the present invention is an operation log data management apparatus which manages operation log data transmitted by at least one device, the apparatus comprising: a pattern extracting unit operable to extract a frequent operation pattern from the operation log data transmitted by said device; a pattern monitoring unit operable to monitor whether or not an operation sequence of operation log data newly transmitted by said device corresponds with the frequent operation pattern; and a pattern classifying unit operable to specify an operator of the frequent operation pattern.

Thus, operation log data of each device can be collected, and such operation log data as described above can be integrally managed. Therefore, it is possible to specify which user performed a frequent operation pattern without including a means for directly identifying a user such as an identification device.

In addition, the service providing apparatus according to the present invention comprises: a service determining unit operable to determine a service associated with a user's behavior based on information received from an operation log data management apparatus that manages operation log data of at least one device; a service selecting unit operable to (i) judge whether or not a plurality of services can be simultaneously provided in the case where the services determined by said service determining unit exist more than one in number, and (ii) select a service to be provided, from among the plurality of services, in the case where as a result of the judgment, the plurality of services cannot be provided simultaneously; and a service outputting unit operable to provide the service selected by said service selecting unit to said device.

Thus, even in the case where a plurality of candidates for a service to be provided exist, but cannot be simultaneously provided, an appropriate service can be selected and provided.

Furthermore, the operation log data management apparatus according to the present invention is the operation log data management apparatus which manages operation log data transmitted by at least one device, the apparatus comprising: a pattern extracting unit operable to extract a frequent operation pattern from the operation log data transmitted by said device; a pattern monitoring unit operable to monitor whether or not an operation sequence of operation log data newly transmitted by said device corresponds with the frequent operation pattern; and an operation confirming unit operable to confirm or correct an operation predicted as an operation the user does not intend, based on the monitoring results of said pattern monitoring unit.

Therefore, the operation partially deviating from the frequent operation pattern is detected, and an alert about the operation is issued to the operator. Then, the operation is aborted, or an alternate operation predicted from the frequent operation pattern is performed. Thus, the operator's error operation or unintended operation can be prevented by confirming and correcting the operation.

The present invention cannot only be realized as the above mentioned operation log data management system, operation log data management apparatus and service providing apparatus, but also as an operation log data management method, an operation log data administration method, a service providing method, or a program which causes a computer to execute such steps as described above. Needless to say, the above mentioned program can be distributed via a recording medium such as a CD-ROM or a transmission medium such as the Internet.

BRIEF DESCRIPTION OF DRAWINGS

FIG. 4 is a diagram showing a data example recorded in the operation log data data base;

FIG. 6 is a diagram showing an example of episode data from the operation log data according to the first embodiment;

FIG. 7 is a diagram showing an example of frequent operation patterns extracted from the operation log data according to the first embodiment;

FIG. 8 is a diagram showing an example of definitions for deterministic operations used for specifying the users according to the first embodiment;

FIG. 10 is a diagram showing an example of frequent operation patterns for each of which the user is specified according to the first embodiment;

FIG. 11 is a diagram showing another example of definitions for deterministic operations used for specifying the users according to the first embodiment;

FIG. 18 shows diagrams respectively showing an example of priority order for providing a service according to the third embodiment; FIG. 18A shows priority order of each user; FIG. 18B shows priority order of each operation;

FIG. 21 shows diagrams respectively showing an example of distribution probability of service distribution according to the fourth embodiment; FIG. 21A shows distribution probability of each user; FIG. 21B shows distribution probability of each operation;

FIG. 25 is a diagram showing an operation example in the case where a performance predicted as an error operation occurs according to the fifth embodiment;

FIG. 29 is a diagram showing an example of operations which should be saved as log data in the device agent according to the sixth embodiment;

FIG. 30 is a diagram showing an example of operation log data sent by the device agent according to the sixth embodiment;

FIG. 31 is a diagram showing an example of operation log data recorded in the operation log data data base;

FIG. 32 is a diagram showing an example of episode data from the operation log data according to the sixth embodiment;

FIG. 33 is a diagram showing an example of frequent operation patterns extracted from the operation log data according to the sixth embodiment;

FIG. 34 is a diagram showing an example of definitions for deterministic operations used for specifying the users according to the sixth embodiment;

DETAILED DESCRIPTION OF THE INVENTION

The first embodiment to the sixth embodiment according to the present invention will be explained respectively in reference to the drawings as following.

First Embodiment

Figure 1:
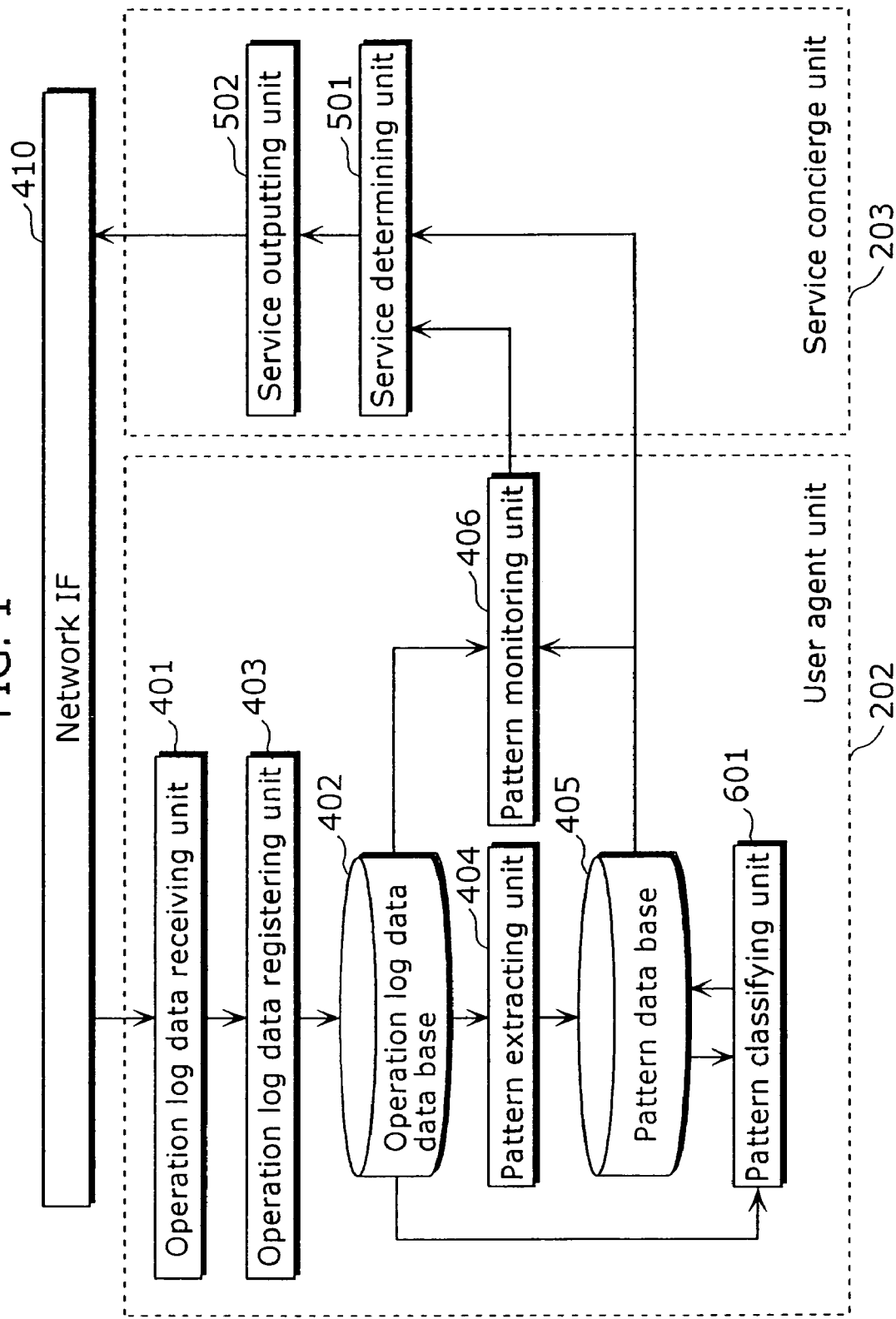
FIG. 1 is a block diagram showing the structure of the operation log data management system according to the first embodiment of the present invention.

FIG. 1 is a block diagram showing the structure of the operation log data management system according to the first embodiment of the present invention;

The operation log data management system is a system for receiving operation log data of devices (not shown in the drawings) such as the household electrical appliances connected via a network, and providing services such as controlling devices and providing information based on the operation log data and the like. Briefly, as shown in FIG. 1, the operation log data management system comprises a user agent unit 202, a service concierge unit 203 and a network IF410.

The user agent unit 202 receives operation log data of a user, and extracts and holds a frequent operation pattern. At the same time, the user agent unit 202 estimates which user performs the frequent operation pattern. The user agent unit 202 includes: an operation log data receiving unit 401; an operation log data data base 402; an operation log data registering unit 403; a pattern extracting unit 404; a pattern data base 405; a pattern monitoring unit 406; and a pattern classifying unit 601.

The operation log data receiving unit 401 receives operation log data of operations and the like performed by the device connected via the network. The operations performed by such device as described above can be performed by the device body and also by, for example, a remote control and the like other than the device body. The operation log data registering unit 403 registers, in the operation log data data base 402, operation log data received by the operation log data receiving unit 401. The operation log data data base 402 memorizes the operation log data. The pattern extracting unit 404 extracts a frequent operation pattern of log data which fulfills predetermined conditions from the operation log data registered in the operation log data data base 402. The pattern data base 405 memorizes the frequent operation pattern of the operation log data extracted by the pattern extracting unit 404. The pattern monitoring unit 406 monitors, from the operation log data registered in the operation log data data base 402 or the operation log data to be newly registered in the operation log data registering unit 403, the log data which corresponds with the frequent operation pattern registered in the pattern data base 405. The pattern classifying unit 601 specifies the operator of the frequent operation pattern of the operation log data memorized in the pattern data base 405.

On the other hand, the service concierge unit 203 provides services such as device control and information provision, based on the information about the user memorized by the user agent unit 202, specifically the operation log data of the user and the frequent operation pattern. And, the service concierge unit 203 includes a service determining unit 501 and a service outputting unit 502.

The service determining unit 501 estimates service contents for providing, such as device control and information provision to the device connected via the network. The service outputting unit 502 outputs the service estimated by the service determining unit 501 to the device corresponding to the service.

Next, the operations of the operation log data management system structured as described above will be explained.

Figures 2, 3:
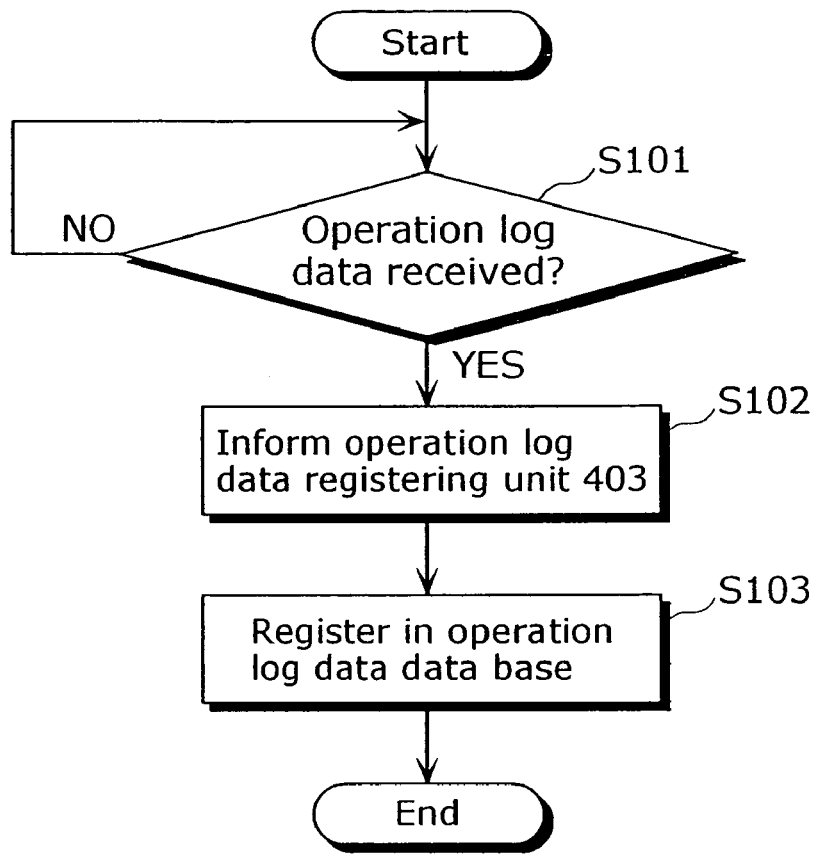
FIG. 2 is a flow chart showing the flow of operations in the case where the operation log data is registered according to the first embodiment.
FIG. 3 is a diagram showing an example of operations which should be saved as log data.

According to the first embodiment, before a user is specified for a frequent operation pattern, first, a frequent operation pattern that frequently appears is extracted. FIG. 2 is a flow chart showing the flow of operations in the case of registering operation log data. FIG. 3 is a diagram showing an example of operation type identifiers, defined for each operation type used for the operation log data. FIG. 4 is a diagram showing a data example recorded by the operation log data data base 402.

The operation log data receiving unit 401 confirms whether or not the operation log data is received (step S101). Here, in the case where the operation log data is not received, the operation log data receiving unit 401 continues, in a predetermined cycle, confirming whether or not the operation log data is received. On the other hand, in the case where the operation log data is received, the operation log data receiving unit 401 informs the operation log data registering unit 403 that the operation log data is received (step S102). Here, the operation log data received by the operation log data receiving unit 401 is, for example, the operation type identifier defined for each operation type, as shown in FIG. 3, and the operation date. If necessary, such operation log data takes a format accompanied with an argument and the like that indicate details of the operation.

The operation log data registering unit 403 takes out the operation log data received by the operation log data receiving unit 401, and registers the operation log data in the operation log data data base 402 (step S103). In the operation log data data base 402, for example, as shown in FIG. 4, the received operation log data is memorized in the order of the operation date.

Figure 5:
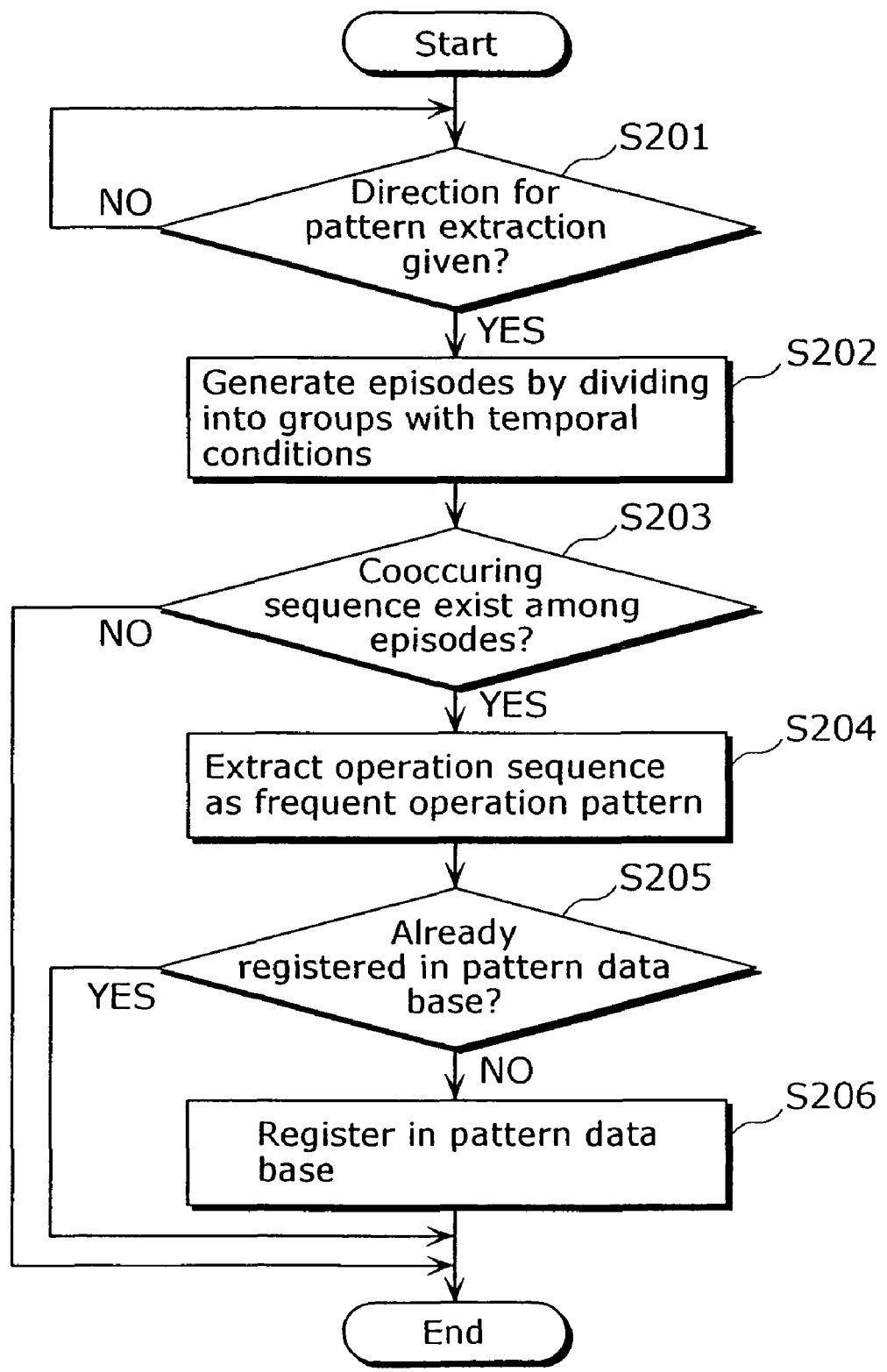
FIG. 5 is a flow chart showing the flow of operations in the case where a frequent operation pattern is extracted according to the first embodiment.

Next, a frequent operation pattern is extracted from the above mentioned operation log data registered in the operation log data data base 402. FIG. 5 is a flow chart showing the flow of operations in the case of extracting a frequent operation pattern.

The pattern extracting unit 404 confirms whether or not the direction for pattern extraction is given (step S201). As the direction for the above mentioned pattern extraction, for example, an extraction renewing order for the operation log data pattern which periodically occurs inside the system, a question reception from the outside of the system, and the like can be used. As a result of the above mentioned confirmation, in the case where the direction for pattern extraction is not provided, the pattern extracting unit 404 continues, in a predetermined cycle, confirming whether or not the direction for pattern extraction is provided.

On the other hand, in the case where the direction for pattern extraction is provided, the pattern extracting unit 404 refers to the operation log data registered in the operation log data data base 402, and classifies the operation log data into groups, by the operation date, under predetermined conditions. In the operation log data data base 402, data as shown in FIG. 4 is registered as described above. The registered data is sorted using the operation date, and the data whose intervals with the adjacent data are the predetermined time or less is classified in the same group. For example, under the condition that the intervals between the adjacent data should be 5 minutes or less, in the example as shown in FIG. 4, the data can be classified into 5 groups as shown in group 1001 to group 1005.

Such classified groups as described above respectively include operation sequences as shown in FIG. 6. Such group of operation sequences belonging to one group is called an episode. The occurrence order of the operation sequences in one episode may be considered or not. In the present explanation, it is not considered. Also, in classifying into groups, the case where the temporal intervals between the adjacent data are the predetermined time or less is explained here. However, as a simple method, the method for classifying into groups using the predetermined time intervals may be used. For example, there is a method for classifying into groups by setting the temporal intervals as 10 minutes, from every hour to 10 minutes, 10 minutes to 20 minutes, 20 minutes to 30 minutes (hereinafter in the same manner) and the like.

Next, the pattern extracting unit 404 confirms whether or not an operation sequence cooccuring among the episodes classified as described above exists (step S202). In other words, the pattern extracting unit 404 confirms whether or not the same operation sequence or the operation sequences that partially correspond with each other exist among the episodes (step S203). Here, in the case where the same operation sequence or the operation sequences that partially correspond with each other do not exist, the pattern extracting unit 404 finishes the process.

On the other hand, in the case where the same operation sequence or the operation sequences that partially correspond with each other exist, the pattern extracting unit 404 extracts the operation sequence as the frequent operation pattern (step S204). For example, in the example as shown in FIG. 6, the episode 1001 and the episode 1004 are both "PowerOn, Opr1, Opr4", and the episodes completely correspond with each other. Also, the episode 1003 and the episode 1005 correspond with each other in the part, "PowerOff, Opr2". Thus, the corresponding two episodes or the corresponding part of the episodes become candidates to be registered, as the frequent operation sequence pattern, in the pattern data base 405. Here, as a condition for judging the correspondence or the partial correspondence among the episodes, at least a predetermined number or more of two or more of the elements forming each episode should correspond with each other.

Next, the pattern extracting unit 404 confirms whether or not the extracted frequent operation pattern is the pattern already registered in the pattern data base 405 (step S205). In the case where the extracted frequent operation pattern is already registered, the pattern extracting unit 404 finishes the process. On the other hand, in the case where the extracted frequent operation pattern is not registered, the pattern extracting unit 404 registers the extracted frequent operation pattern in the pattern data base 405 (step S206). As described above, in the pattern data base 405, for example, the frequent operation pattern as shown in FIG. 7 is registered.

For example, the No. 1 data as shown in FIG. 7 indicates the stereotyped pattern of the action, "after turning on the power of the device, perform the operation 1 and the operation 4". Similarly, the No. 2 data indicates the pattern, "after the operation 2, turn off the power". Also, the No. 3, No. 4 and the No. 5 are extracted in such procedures as described above, and registered in the pattern data base 405.

Next, specification, by the pattern classifying unit 601, of a user performing the operation of a frequent operation pattern will be explained. In specifying the user, a deterministic operation is defined for each user in advance.

FIG. 8 is a diagram showing an example of the definition for the deterministic operation. The deterministic operation means the operation in which for a certain operation, the operator is definitely a specific user, and is the operation, "the operator of this operation is definitely the user X". The example as shown in FIG. 8 indicates that the operator of the Opr5 is definitely the user A, and the operator who turns off the power is definitely the user C. Also, such deterministic operation as described above cannot only be associated with the user who definitely performs a certain operation, but also with the user who performs the certain operation with a high probability. In such case as described above, for example, as shown in FIG. 11, it is desirable to manage the confidence degree according to the probability, as well.

Figure 9:
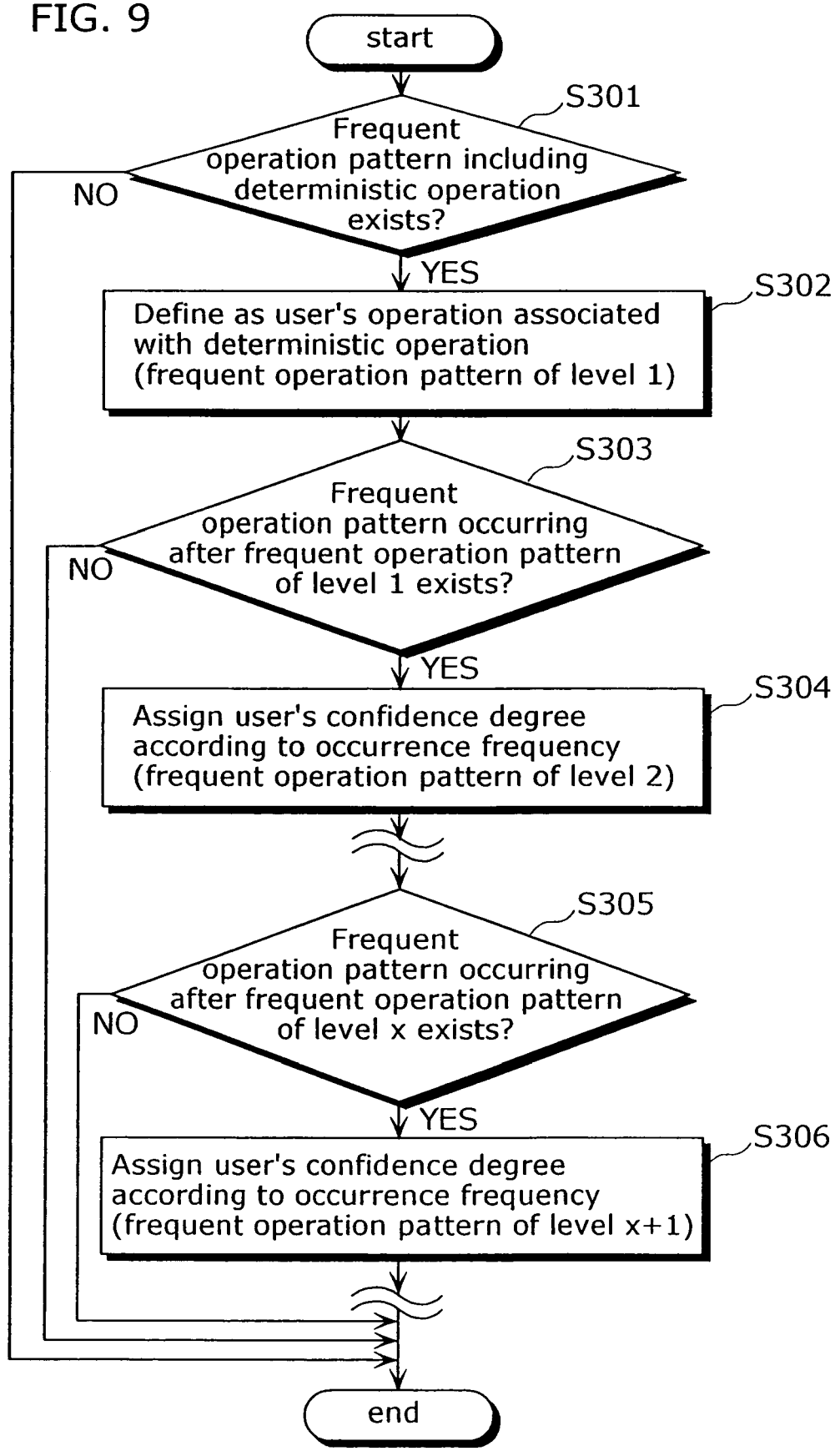
FIG. 9 is a flow chart showing the flow of operations in the case of specifying which user performed the frequent operation pattern according to the first embodiment.

FIG. 9 is a flow chart showing the flow of operations in the case of specifying which user performs the frequent operation pattern. Here, as shown in FIG. 8, the deterministic operation is defined.

The pattern classifying unit 601 confirms whether or not a frequent operation pattern including the deterministic operation as shown in FIG. 8 exists among the frequent operation patterns registered in the pattern data base 405 (step S301). Here, if the frequent operation pattern including the deterministic operation does not exist, the pattern classifying unit 601 finishes the process. On the other hand, in the case where the frequent operation pattern including the deterministic operation exists, the pattern classifying unit 601 defines the frequent operation pattern as the operation by the user corresponding to the current deterministic operation, and registers in the pattern data base 405 (step S302).

For example, in the case where the frequent operation pattern as shown in FIG. 7 is registered in the pattern data base 405, in reference to the deterministic operation as shown in FIG. 8, the frequent operation pattern No. 2 includes "PowerOff", and is defined as the operation of the user C according to FIG. 8. Similarly, as the frequent operation pattern No. 1 includes "Opr1", it is defined as the operation of the user D. As the frequent operation pattern No. 3 includes "Opr 3", it is defined as the operation of the user B. And, as the frequent operation pattern No. 6 includes "Opr 5", it is defined as the operation of the user A. Such frequent operation patterns No. 1, 2, 3 and 6 as described above include deterministic operations themselves, and are called the frequent operation patterns of level 1. In the case where one frequent operation pattern includes a plurality of deterministic operations, and users corresponding to such plurality of deterministic operations differ, the operator of the frequent operation pattern may be defined, according to, for example, the confidence degree as shown in FIG. 11.

Next, the pattern classifying unit 601 confirms whether or not a frequent operation pattern occurring after the frequent operation patterns of level 1 exists, among the rest of the frequent operation patterns that are not classified as such frequent operation patterns of level 1 as described above, in the frequent operation patterns registered in the pattern data base 405 (step S303). Here, if the frequent operation pattern occurring after the frequent operation pattern of level 1 does not exist, the pattern classifying unit 601 finishes the process. On the other hand, in the case where the frequent operation pattern occurring after the frequent operation pattern of level 1 exists, the pattern classifying unit 601 defines the operator with a confidence degree, according to the occurrence frequency, and registers in the pattern data base 405 (step S304). In other words, the pattern classifying unit 601, in reference to the operation log data data base 402 and the pattern data base 405, detects occurrence frequency such as after which frequent operation pattern of level 1 the current frequent operation pattern occurs, whether the current frequent operation pattern occurs after the operation sequence of the frequent operation pattern other than level 1 or after the operation sequence other than the extracted frequent operation pattern. And, the pattern classifying unit 601 defines the operator with the confidence degree, according to the frequency of occurring after the frequent operation pattern of level 1.

For example, suppose that the probability of the No. 4 frequent operation pattern occurring after the No. 1 frequent operation pattern (level 1) is 60%; the probability of the No. 4 frequent operation pattern occurring after the No. 3 frequent operation pattern (level 1) is 15%; and the probability of the No. 4 frequent operation pattern occurring after the operation sequence of the frequent operation pattern other than level 1 or after the operation sequence other than the extracted frequent operation pattern is 25%. In such case as described above, since the No. 1 frequent operation pattern is defined as the user C, and the No. 3 frequent operation pattern is defined as the user B, the operator of the No. 4 frequent operation pattern accords to the frequency of occurrence from the frequent operation pattern of level 1. Thus, the confidence degree of the user C is defined as "0.6" and the confidence degree of the user B is defined as "0.15". Such No. 4 frequent operation pattern as described above is called a frequent operation pattern of level 2.

Next, the pattern classifying unit 601 confirms whether or not the frequent operation pattern occurring after the frequent operation pattern of level 2 exists, among the rest of the frequent operation patterns that are not classified as such frequent operation patterns of level 1 and level 2 as described above, among the frequent operation patterns registered in the pattern data base 405 (step S305). Here, if the frequent operation pattern which occurs after the frequent operation pattern of level 1 does not exist, the pattern classifying unit 601 finishes the process. On the other hand, in the case where the frequent operation pattern occurring after the frequent operation pattern of level 1 exists, the pattern classifying unit 601 defines the operator with the confidence degree according to the occurrence frequency, and registers the operator in the pattern data base 405 (step S306).

For example, by referring to the operation log data data base 402 and the pattern data base 405, suppose that the probability of the No. 5 frequent operation pattern occurring after the No. 4 frequent operation pattern (level 2) is 50% and the probability of the No. 5 frequent operation pattern occurring after the operation sequence of the frequent operation pattern other than level 2 or after the operation sequence other than the extracted frequent operation pattern is 50%. In such case as described above, for the No. 4 frequent operation pattern, the confidence degree of the user C is defined as "0.6", and the confidence degree of the user B is defined as "0.15". Thus, the operator of the No. 5 frequent operation pattern multiplies the confidence degree of the frequent operation pattern of level 2 by the frequency of occurrence from the frequent operation pattern of level 2. And, the confidence degree of the user C is defined as "0.3", and the confidence degree of the user B is defined as "0.075". Such frequent operation pattern No. 4 is called the frequent operation pattern of level 2.

Also, the similar processes are recursively repeated for level 3 and level 4, and continued until the current frequent operation pattern does not exist. As described above, for the frequent operation pattern, the operator is estimated as shown in FIG. 10, and registered in the pattern data base 405.

As described above, by using information of the frequent operation pattern and the operator registered in the pattern data base 405, it is possible to provide a service according to the frequent operation pattern of the operation performed by the user. As such service according to the frequent operation pattern as described above, for example, out of the received operation sequence, the operation which partially corresponds with the pattern data base 405 is searched; the operation to be received next is predicted; and by looking ahead the predicted operation, a signal for device control is outputted. Also, out of the received operation sequence, the performing user is estimated, and information according to the user is outputted. As described above, various kinds of services according to the frequent operation pattern are conceivable.

Figure 12:
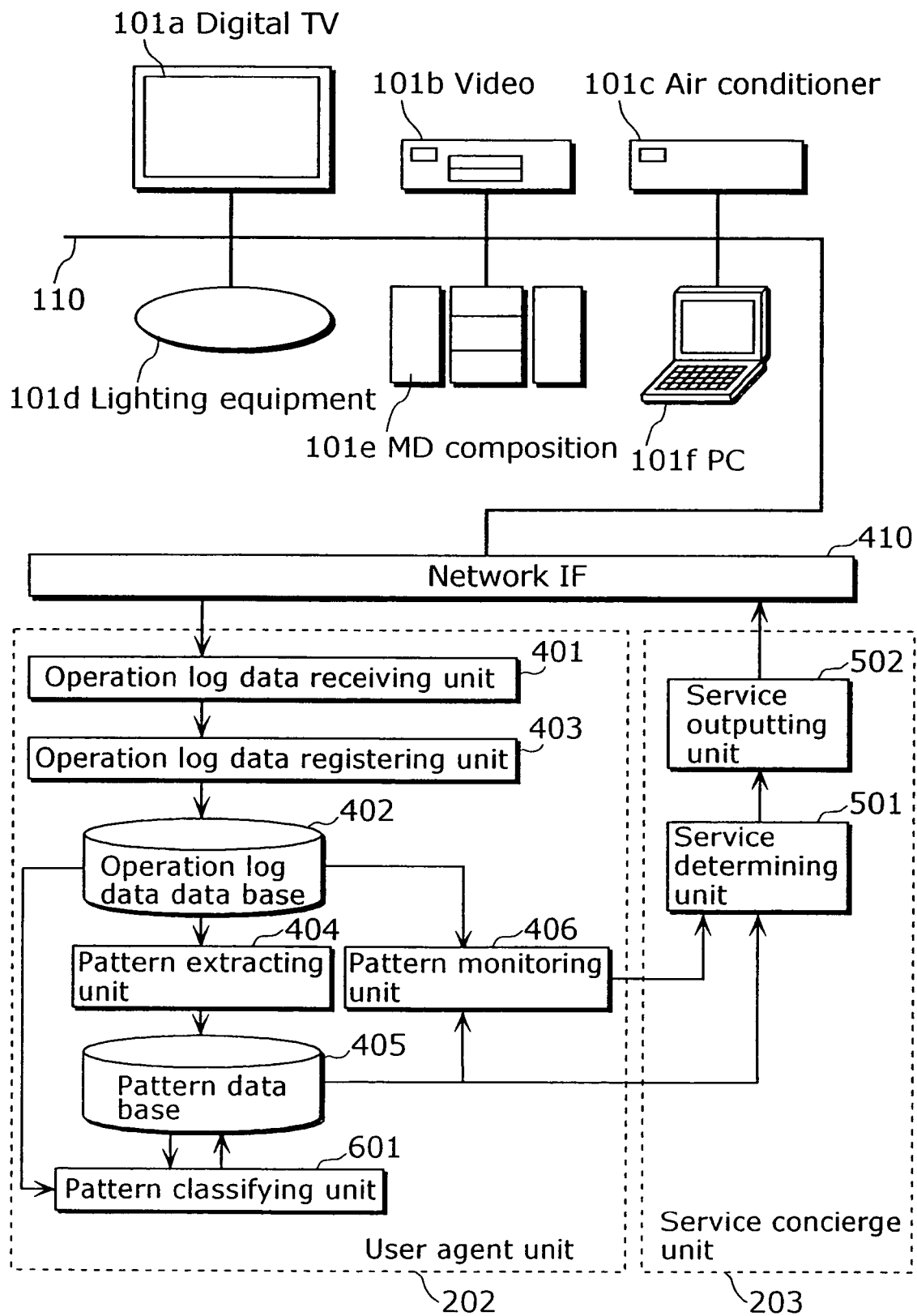
FIG. 12 is a block diagram showing, including devices, the structure of the operation log data management system according to the first embodiment as shown in FIG. 1.

For example, in the operation log data management system where to a user agent unit 202 and a service concierge unit 203, as shown in FIG. 12, via a network IF 410 and a network, terminal household electrical devices 101 such as a digital TV (hereinafter referred to simply as a television or a TV) 101a, a video 101b, an air conditioner 101c, a lighting equipment 101d, an MD composition 101e and a Personal Computer (PC) 101f are connected, the service concierge unit 203 can provide the following services.

For example, in the case where the frequent operation pattern such as "after turning off the TV, listen to music with the MD" is registered, it is possible to provide the service to automatically turn on the power of the MD composition when the fact that the TV is turned off by the user is detected.

In addition, for example, suppose the case where that the operator of the frequent operation pattern such as "after turning off the TV and making the light dim, listen to music with the MD" is the user A, and the operator of the frequent operation pattern such as "after turning off the TV and turning on the light, listen to music with the MD" is the user B is estimated, and registered in the pattern data base 405. In such case as described above, when the fact that the TV is turned off by the user and the light is made dim is detected, the service to automatically turn on the power of the MD composition and select and play the song corresponding to the user B's taste that is registered in advance can be provided.

Moreover, for example, suppose the case that the operator of the frequent operation pattern such as "after turning on the TV, turn on the air conditioner" and "after turning on the air conditioner, setting the temperature to 27 degrees" is the user A, and the operator of the frequent operation pattern such as "after turning on the MD composition, turn on the air conditioner" and "after turning on the air conditioner, set the temperature to 24 degrees" is the user B is estimated and registered in the pattern data base 405. In such case as described above, when the fact that the TV is turned on by the user is detected, the service to automatically turn on the power of the air conditioner, and set the temperature to 27 degrees can be provided. On the other hand, when the fact that the MD composition is turned on by the user is detected, the service to automatically turn on the power of the air conditioner and set the temperature to 24 degrees can be provided.

As described above, according to the first embodiment, the frequent operation pattern is extracted and held out of the received operation log data, and based on the operation log data and deterministic operation information, which user performed the frequent operation pattern can be estimated.

Thus, without including a means to directly identify the user such as the identification device and the like, it is possible to specify, out of various log data information, to which user the indispensable log data for extracting the information to use for service belongs. In particular, even in the home where it is still ordinary that a plurality of users use the same device without using an identification device, it is possible to specify to which user the log data belongs, thus beneficial.

Also, by specifying the user as described above, a delicate service associated with the user such as outputting information according to the user can be provided.

Figure 13:
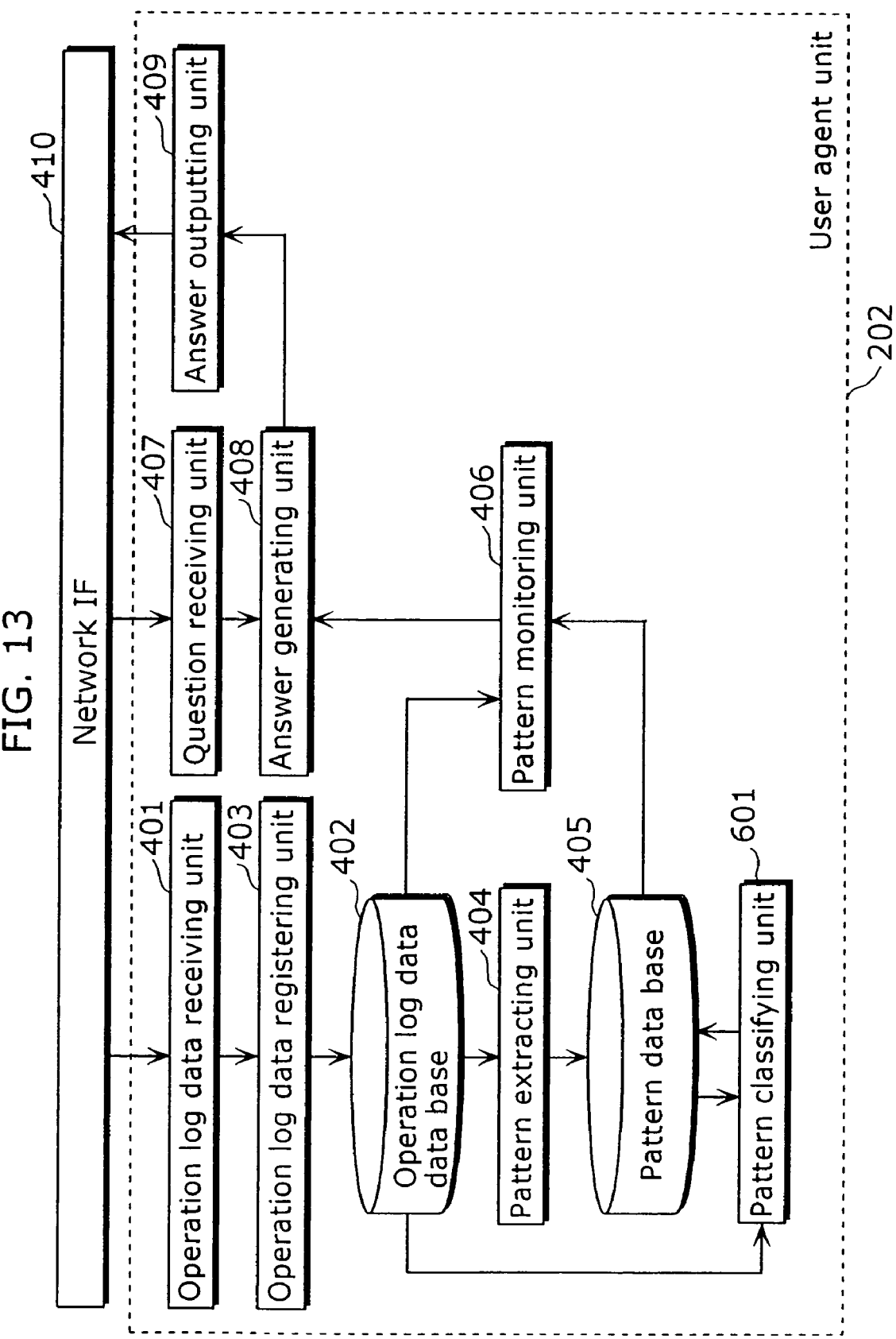
FIG. 13 is a block diagram showing another structure of the operation log data management system according to the first embodiment.

According to the first embodiment, the structure including the user agent unit 202 and the service concierge unit 203 is used. However, the service concierge unit 203 is not always necessary. And, the structure where the service concierge unit 203 exists outside the system, and the user agent unit 202 outputs information concerning the frequent operation pattern of the user that is necessary for the service concierge unit 203 to provide a service is possible. For example, as shown in FIG. 13, in addition to the structure of the user agent unit 202 as shown in FIG. 1, the structure including a question receiving unit 407 for receiving questions concerning the user operation information from the service concierge unit 203, an answer generating unit 408 for generating an answer for the received question, and the answer outputting unit 409 for outputting the generated answer to the service concierge unit 203 is possible.

Also, according to the first embodiment, the system is structured for the case where the reception of the operation log data of the device and the service outputting are performed via the network. However, the network IF 410 is not an indispensable component, and can be omitted. For example, in the case where the network IF 410 is omitted, the operation log data receiving unit 401 can receive a remote control operation signal of the device, or make the direct operation from the operation panel as input. And, the service outputting unit 502 can output to a display panel or a separately set interface unit.

Second Embodiment

According to the second embodiment, the case of specifying which user performed the frequent operation pattern, using a different method from the first embodiment will be explained.

Figure 14:
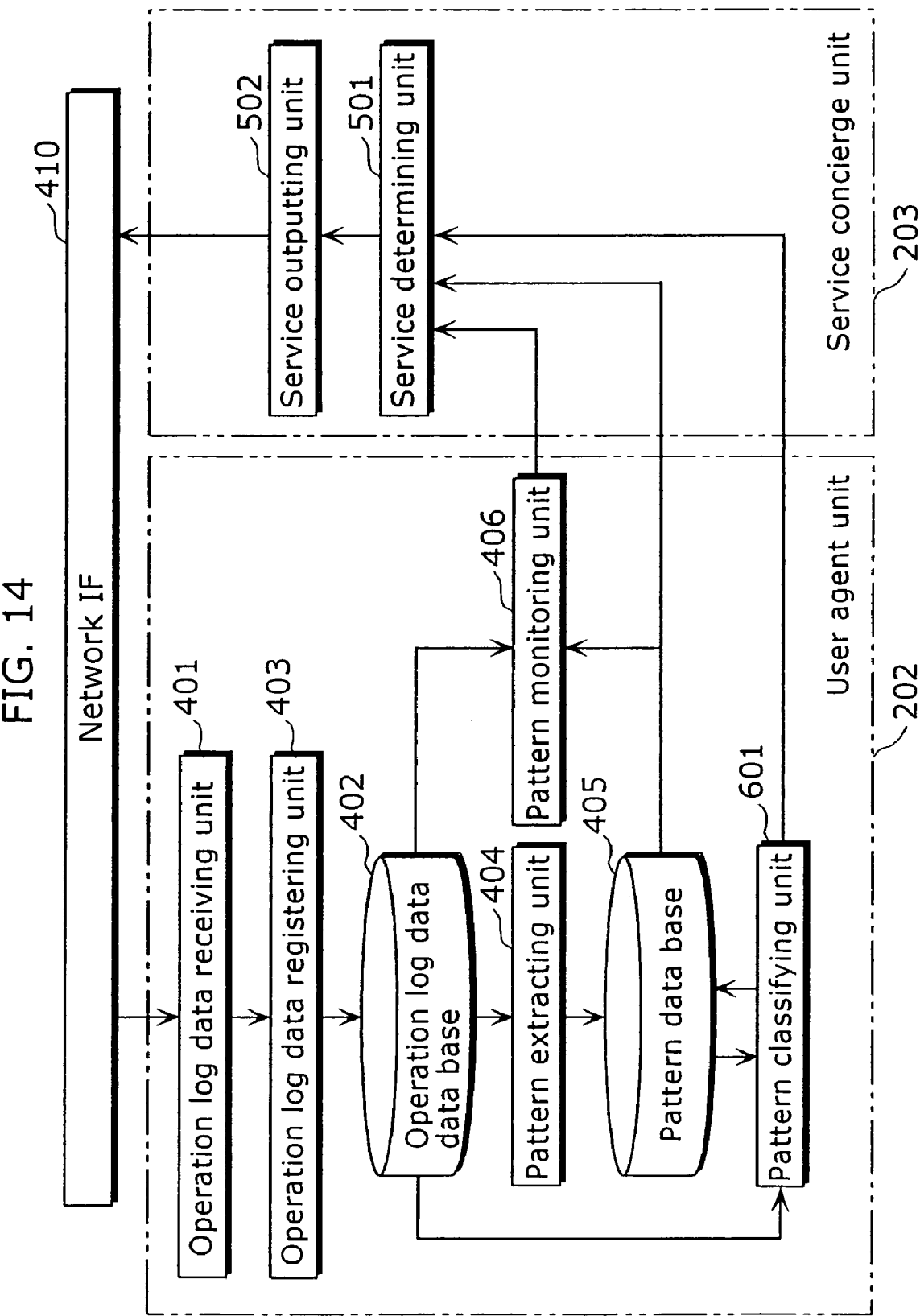
FIG. 14 is a block diagram showing the structure of the operation log data management system according to the second embodiment of the present invention.

FIG. 14 is a block diagram showing the structure of the operation log data management system according to the second embodiment of the present invention. The operation log data management system has a similar structure to that of the first embodiment. What is different is that the pattern classifying unit 601 outputs to the service determining unit 501. The similar parts to the first embodiment will be provided with the same codes, and the specific explanation will be omitted. Also, according to the second embodiment, the method for extracting the frequent operation pattern from the received operation log data and registering is the same as the method as explained in the first embodiment. Thus, the explanation will be omitted here.

Specification of the user, in the pattern classifying unit 601, who performed the frequent operation pattern will be explained. In specifying the user, the deterministic operation is defined for each user in advance, as well as the first embodiment. Here, as well as the first embodiment, as shown in FIG. 8, the deterministic operation is defined.

Figure 16:
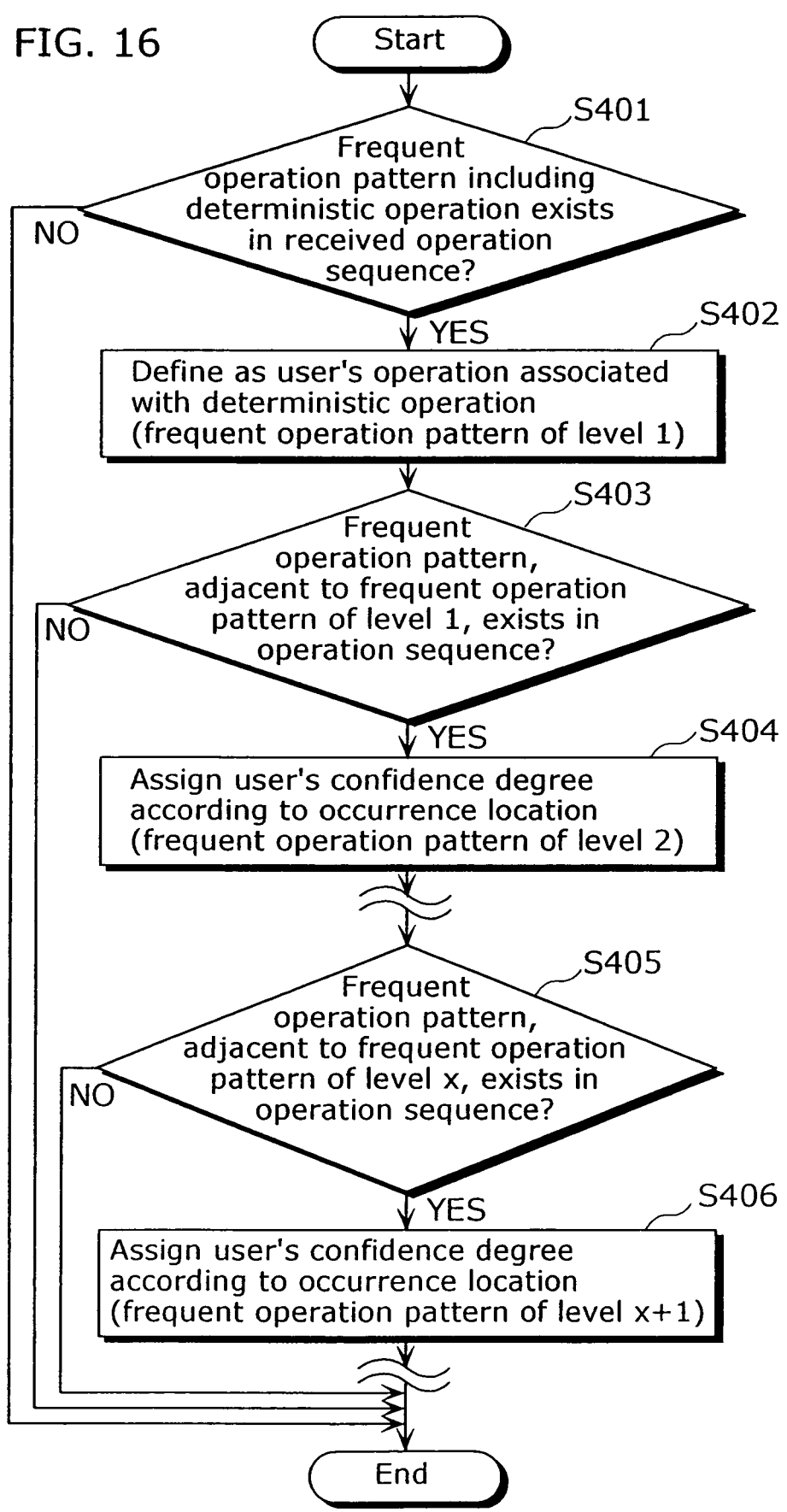
FIG. 16 is a flow chart showing the flow of operations in the case of specifying which user performed a frequent operation pattern according to the second embodiment.

FIG. 16 is a flow chart showing the flow of operations in the case of specifying which user performed the frequent operation pattern.

The pattern classifying unit 601 confirms whether or not the frequent operation pattern including the deterministic operation as shown in FIG. 8 exists, in the operation sequence of the operation log data received by the operation log data receiving unit 401, said frequent operation pattern being registered in the pattern database 405 (step S401). Here, if the current frequent operation pattern does not exist, the pattern classifying unit 601 finishes the process. On the other hand, in the case where the current frequent operation pattern exists, the pattern classifying unit 601 defines the corresponding part of the received operation sequence as the operation performed by the user corresponding to the current deterministic operation, and registers in the pattern data base 405 (step S402).

Figure 15:
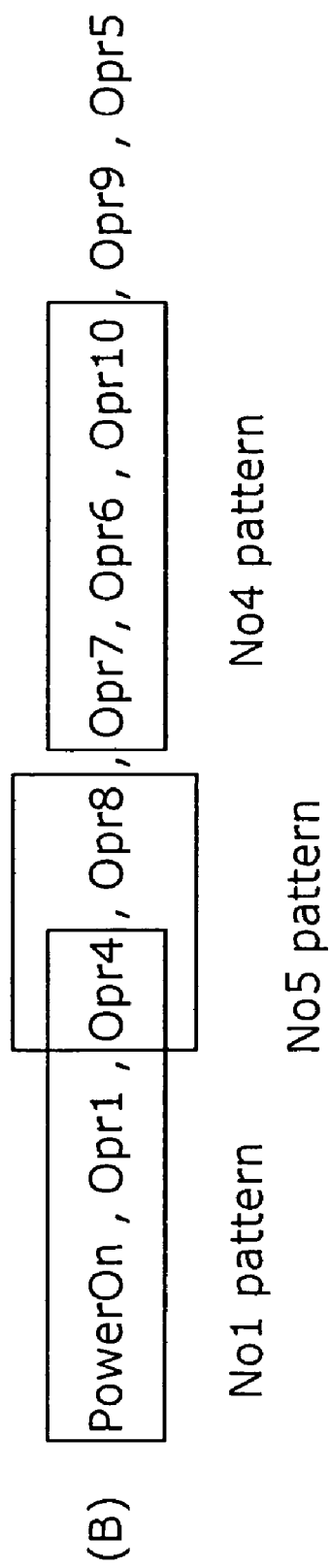
FIG. 15 is a diagram showing an example of operation log data received according to the second embodiment.

FIG. 15 is a diagram showing an example of the operation sequence received by the operation log data receiving unit 401. Here, suppose that the operation log data receiving unit 401 received the operation sequence as shown in FIG. 15A. In such case as described above, the part described as No. 1, "PowerOn, Opr1, Opr4" as shown in FIG. 15B corresponds with the frequent operation pattern No. 1 as shown in FIG. 7. Since such No. 1 frequent operation pattern as described above includes "Opr1", it is defined as the operation performed by the user D. This is called the frequent operation pattern of level 1, and estimated as the operation of the user D with the confidence degree=1. Here, the frequent operation pattern including the deterministic operation is defined as the operation by the corresponding user with the confidence degree of 1. However, the arbitrary confidence degree defined in advance may be used.

Next, the pattern classifying unit 601 confirms whether or not the frequent operation pattern registered in the pattern data base 405, which is adjacent to the above mentioned frequent operation pattern of level 1, appears in the operation sequence received by the operation log data receiving unit 401 (step S403). Here, if the adjacent frequent operation pattern does not appear, the pattern classifying unit 601 finishes the process. On the other hand, in the case where the adjacent frequent operation pattern appears, the pattern classifying unit 601, according to the appearance location of the adjacently appearing frequent pattern, defines the operator with the confidence degree, and registers in the pattern data base 405 (step S404). Here, "adjacent" means that adjacent patterns do not have other operations in between, or a part of adjacent patterns overlaps. In other words, the pattern classifying unit 601 calculates the confidence degree Conf (n) using the equation (A) as shown below, and defines that the operator corresponding to the frequent operation pattern of level 1 performed the operation, using the calculated confidence degree Conf (n).

$$Conf(n) = Conf(1) \alpha \prod_{i=}^{n} f(d(i))$$ (A)

Here, d(i) is an overlap of the frequent operation pattern of level i and the frequent operation pattern of level i-1 that are adjacent to each other, and indicates the number of overlapping operations. In the example of FIG. 15, d(2)=1. In the case where there is no overlap between the adjacent frequent operation patterns, and the patterns are tightly adjacent to each other, d(i)=0 is defined. In the case where other operations exist between the adjacent frequent operation patterns, d(i) is defined as the number of operations existing in between the adjacent patterns, multiplied by −1. Also, f(d(i)) is 0≦f(d(i))<1, and monotone-increases in relation to the value of d(i) which is 0 or larger. Also, in relation to d(i) which is smaller than 0, f=0. And, a is a constant. Also, Conf(1) is a confidence degree for the frequent operation pattern of level 1, and Conf(1)=1.

For example, in the operation sequence as shown in FIG. 15B, the No. 5 frequent operation pattern, adjacent to the No. 1 frequent operation pattern detected as level 1, appears. Here, between the No. 1 frequent operation pattern and the No. 5 frequent operation pattern, the operation called "Opr4" overlaps. Such No. 5 frequent operation pattern as described above is called the frequent operation pattern of level 2. Here, the operator of the frequent operation pattern of level 2 is estimated as the user D who is the operator of the frequent operation pattern of level 1, using the confidence degree Conf (2) calculated by the above mentioned equation (A).

Next, the pattern classifying unit 601 confirms whether or not the frequent operation pattern registered in the pattern data base 405, which is adjacent to the above mentioned frequent operation patterns of level 2, appears in the operation sequence received by the operation log data receiving unit 401 (step S405). Here, if the frequent operation patterns that are adjacent to each other do not appear, the pattern classifying unit 601 finishes the process. On the other hand, in the case where the frequent operation patterns that are adjacent to each other appear, the pattern classifying unit 601, as well as the case of the above mentioned frequent operation pattern of level 2, according to the appearance location of the adjacently appearing frequent operation patterns, defines the operator with a confidence degree, and registers in the pattern data base 405 (step S406).

For example, in the operation sequence as shown in FIG. 15B, the No. 4 frequent operation pattern appears, adjacent to the No. 5 frequent operation pattern. Here, in the above mentioned equation (A), d(i)=0, and such No. 4 frequent operation pattern as described above is called the frequent operation pattern of level 3. Here, the operator of the frequent operation pattern of level 3 is estimated as the user D, using the confidence degree Conf (3).

Hereinafter, as well, whether or not the frequent operation pattern of level x exists is sequentially confirmed, and repeated until the current frequent operation pattern cannot be found.

The confidence degree of the operator calculated by the above mentioned equation (A) indicates characteristics of decreasing as the level of the frequent operation pattern rises, but the decrease rate lowers as the overlap between the adjacent patterns increases.

As described above, according to the second embodiment, by using the frequent operation pattern registered in the pattern data base 405, to which user the operation sequence of the operation log data being received belongs can be dynamically judged. Thus, it is possible to arbitrarily answer to questions from outside of the system.

Thus, as well as the first embodiment, without including a means to directly identify the user such as the identification device, it is possible to specify, out of various log data information, to which user the indispensable log data for extracting the information to use for service belongs. In particular, even in the home where it is still ordinary that a plurality of users use the same device without using an identification device, it is possible to specify to which user the log data belongs, thus beneficial.

Also, by specifying the user as described above, a delicate service associated with the user such as outputting information according to the user can be provided.

The second embodiment is an example of estimating to which user the current operation sequence belongs by referring to the operator of the frequent operation pattern including the deterministic operation. And, the confidence degree may be determined according to the degree of overlapping between the frequent operation pattern including the deterministic operation and the linked frequent operation pattern, and to the distance from the frequent operation pattern.

Also, according to the second embodiment, the case where to which user the operation sequence of the operation log data being received belongs is estimated is explained. However, in the case of the operation sequence of the operation log data registered in the operation log data data base 402 as well, to which user the operation sequence belongs can be estimated.

Third Embodiment

Figure 17:
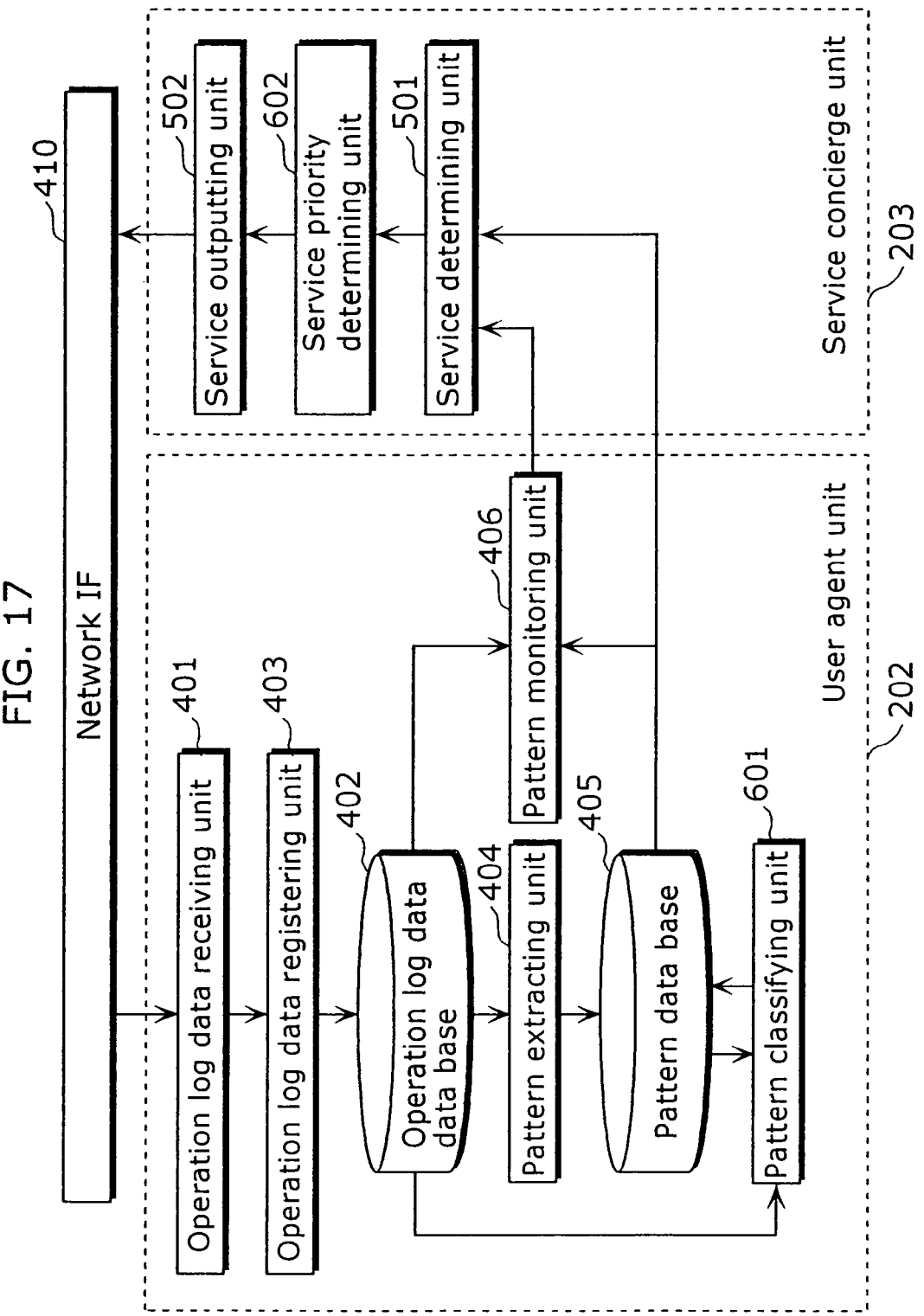
FIG. 17 is a block diagram showing the structure of the operation log data management system according to the third embodiment of the present invention.

FIG. 17 is a block diagram showing the structure of the operation log data management system according to the third embodiment of the present invention. Such operation log data management system as described above comprises, in addition to the structure of the first embodiment, a service priority determining unit 602 included in the service concierge unit 203, and the rest of the structure is the same as the first embodiment. According to the third embodiment, the frequent operation pattern is extracted out of the received user's operation log data, and memorized in the pattern data base 405. Also, by using the memorized frequent operation pattern, the next operation of the user is predicted from the operation sequence of the operation log data currently being received, and the services such as device control and information provision, associated with the predicted next operation, is provided. The above mentioned extraction method for the frequent operation pattern and service providing method are the same as the first and second embodiments, and the explanation will be omitted here.

The service priority determining unit 602 selects the service with high priority in the case where it is impossible to simultaneously provide all of the services provided by the service determining unit 501. Also, in the service priority determining unit 602, for each user and each operation, the priority order is respectively defined in advance. FIG. 18 is a diagram showing an example of the defined priority order, that is, (a) the priority order for each user and (b) the priority order for each operation.

Next, in the operation log data management system structured as described above, the performance, after the service to be provided for the user by the service determining unit 501 is estimated, will be explained.

Figure 19:
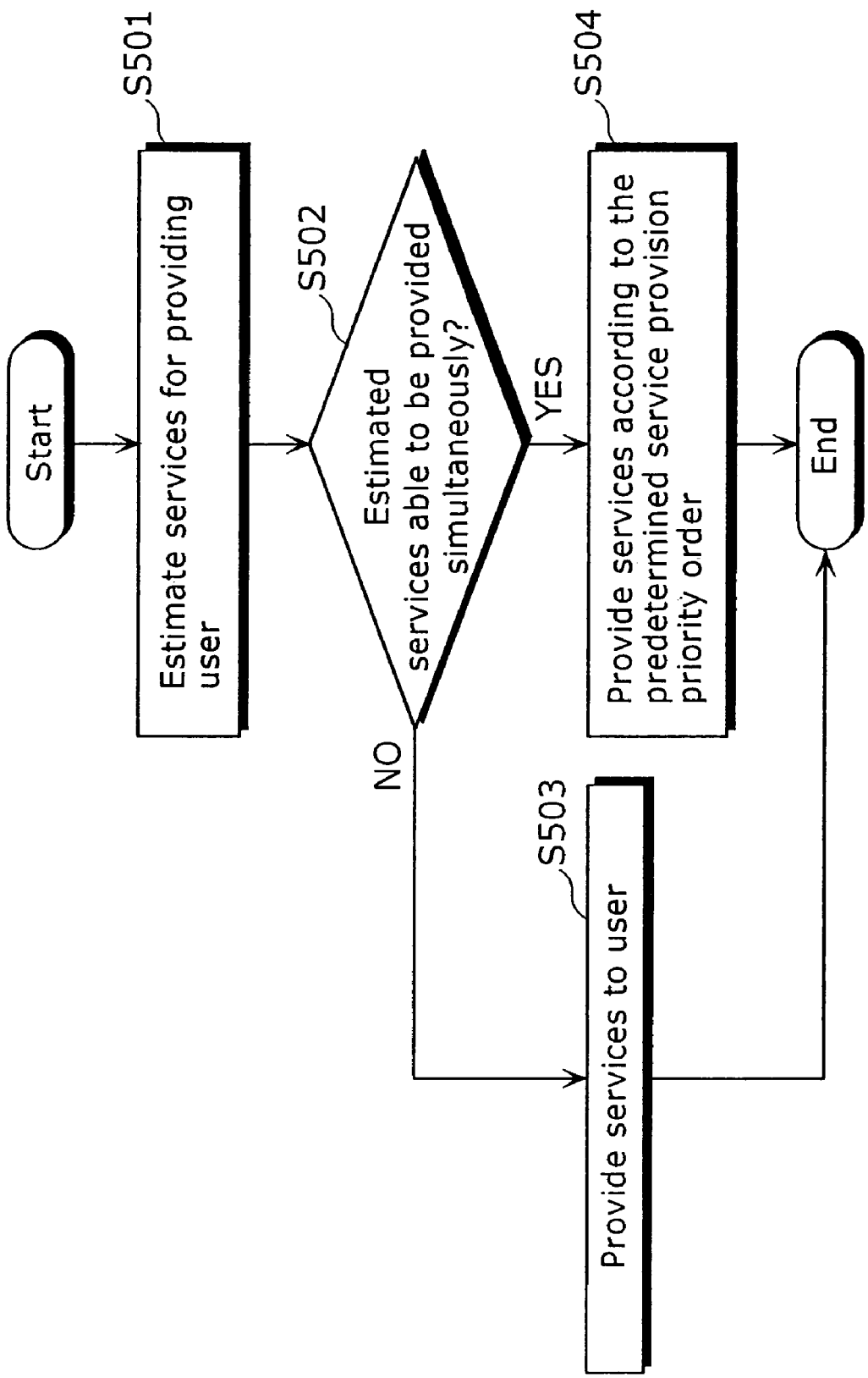
FIG. 19 is a flow chart showing the flow of operations in the case of providing an estimated service according to the third embodiment.

FIG. 19 is a flow chart showing the flow of operations in the case of providing the estimated service.

The service determining unit 501, by using the frequent operation pattern memorized in the pattern data base 405, predicts the next operation of the user from the operation sequence currently being received, and estimates the service to be provided such as device control and information provision, associated with the predicted operation (step S501). Next, the service priority determining unit 602 confirms how many kinds of services estimated by the service determining unit 501 exist, and judges whether or not it is possible to simultaneously provide such services as described above (step S502). Here, in the case where it is possible to simultaneously provide the services estimated by the service determining unit 501, the service priority determining unit 602 informs the fact to the service outputting unit 502. And, the service outputting unit 502 provides the service estimated by the service determining unit 501 (step S503).

On the other hand, in the case where it is impossible to simultaneously provide the services estimated by the service determining unit 501, the service priority determining unit 602, based on the priority order defined in advance as shown in FIG. 18, selects the service with high priority out of the estimated services, and informs the selected service to the service outputting unit 502. And, the service outputting unit 502 provides the service selected by the service priority determining unit 602 (step S504).

For example, suppose that the relation between the frequent operation pattern and the operator, as shown in FIG. 10 is extracted. Here, in the case where the operation log data receiving unit 401 receives "PowerOn, Opr1", the fact, that the service determining unit 501 partially corresponds with the No. 1 frequent operation pattern among the frequent operation patterns as shown in FIG. 10, is informed by the pattern monitoring unit 406. In such case as described above, the service determining unit 501, according to the relation between the frequent operation pattern and the operator registered in the pattern data base 405, recognizes that the next operation for the No. 1 frequent operation pattern is "Opr4", and the operator is the user D. The service determining unit 501 estimates the next predicted operation for "Opr4" as the service to be provided. In such example as described above, there is only one kind of estimated service, the service priority determining unit 602 informs the fact, that it is possible to provide the operation of "Opr4" estimated by the service determining unit 501, to the service outputting unit 502. The service outputting unit 502 outputs the device control according to the operation of "Opr4" as a service.

Also, as another example, for example, in the case where the operation log data receiving unit 401 receives "Opr8, Opr2", the operation partially corresponds with the frequent operation patterns of No. 3 and No. 6, as shown in FIG. 10. The service determining unit 501 recognizes that for the No. 3 frequent operation pattern, the next operation is "Opr3" and the operator is the user B, and for the No. 6 frequent operation pattern, the next operation is "Opr5" and the operator is the user A. Thus, as the operation predicted next, there are two kinds of operations, "Opr3" and "Opr5".

Here, the service priority determining unit 602 judges whether or not it is possible to simultaneously provide the operations, "Opr3" and "Opr5".

In the case where such operations as described above are the operations for different devices, for example, in the case where the operation of "Opr3" is the performance for raising the TV volume, and the operation of "Opr5" is the performance for adjusting the air volume of the air conditioner, it is possible to simultaneously perform such controls as described above. Thus, the service priority determining unit 602 informs the fact, that it is possible to provide the operations estimated by the service determining unit 501, "Opr3" and "Opr5", to the service outputting unit 502. The service outputting unit 502 outputs the device control according to the operations of "Opr3" and "Opr5" as service.

On the other hand, in the case where such operations of "Opr3" and "Opr5" as described above are the operations for the same device, for example, in the case where the operation of "Opr3" is the operation to set the TV channel "4", and the operation of "Opr5" is the operation to set the TV channel "8", it is impossible to simultaneously perform such controls as described above. In such case as described above, since the operation of "Opr3" is estimated from the No. 3 frequent operation pattern, the operator is estimated as the user B. And, since the operation of "Opr5" is estimated from the No. 6 frequent operation pattern, the operator is estimated as the user A. Here, in the priority order as shown in FIG. 18A, the user B has higher priority between the user A and the user B. Thus, the service priority determining unit 602 determines the operation of "Opr3" predicted, based on the frequent operation pattern of the user B, as the service to be provided. Then, the service outputting unit 502 outputs the device control, as a service, associated with the operation of "Opr3".

As described above, according to the third embodiment, even in the case where a plurality of candidates for a service to be provided exist, and cannot be simultaneously provided, it is possible to select and provide the appropriate service.

Thus, as a home where such situation is ordinary as a plurality of users exist in the same space, even in the situation where physical restrictions such as the same device and the same space exist, it is possible to provide as optimum services as possible for all the users who exist there.

According to the third embodiment, based on the priority order between the users as shown in FIG. 18A, a service to be provided is determined. However, such service can be determined, for example, based on the priority order between the operations as shown in FIG. 18B.

Also, according to the third embodiment, the service that is not selected among the plurality of candidates is dismissed. However, in the case where an alternate service that can be simultaneously provided with the selected service exists, by preparing an alternate operation list as shown in FIG. 18C in advance and referring to this, the alternate service can be provided. For example, as for the operation of "Opr5" that is not selected in such example as described above, according to the alternate operation list as shown in FIG. 18C, it can be recognized that the operation of "Opr13" is the alternate operation. Here, if the operation of "Opr13" can be combined with the operation of "Opr3" as services that can be simultaneously provided, it is possible to provide these two kinds of services.

Moreover, according to the third embodiment, as shown in FIG. 17, the structure comprising the user agent unit 202 and the service concierge unit 203 is used. However, as a system structure, as long as the service concierge unit 203 is included, the functions of the user agent unit 202 such as the extraction management of frequent operation pattern and the operator estimation may exist outside of the system where communication is possible.

Fourth Embodiment

According to the fourth embodiment, by a different method from the third embodiment, a case of determining which service to be provided among a plurality of services that cannot be simultaneously provided will be explained.

Figure 20:
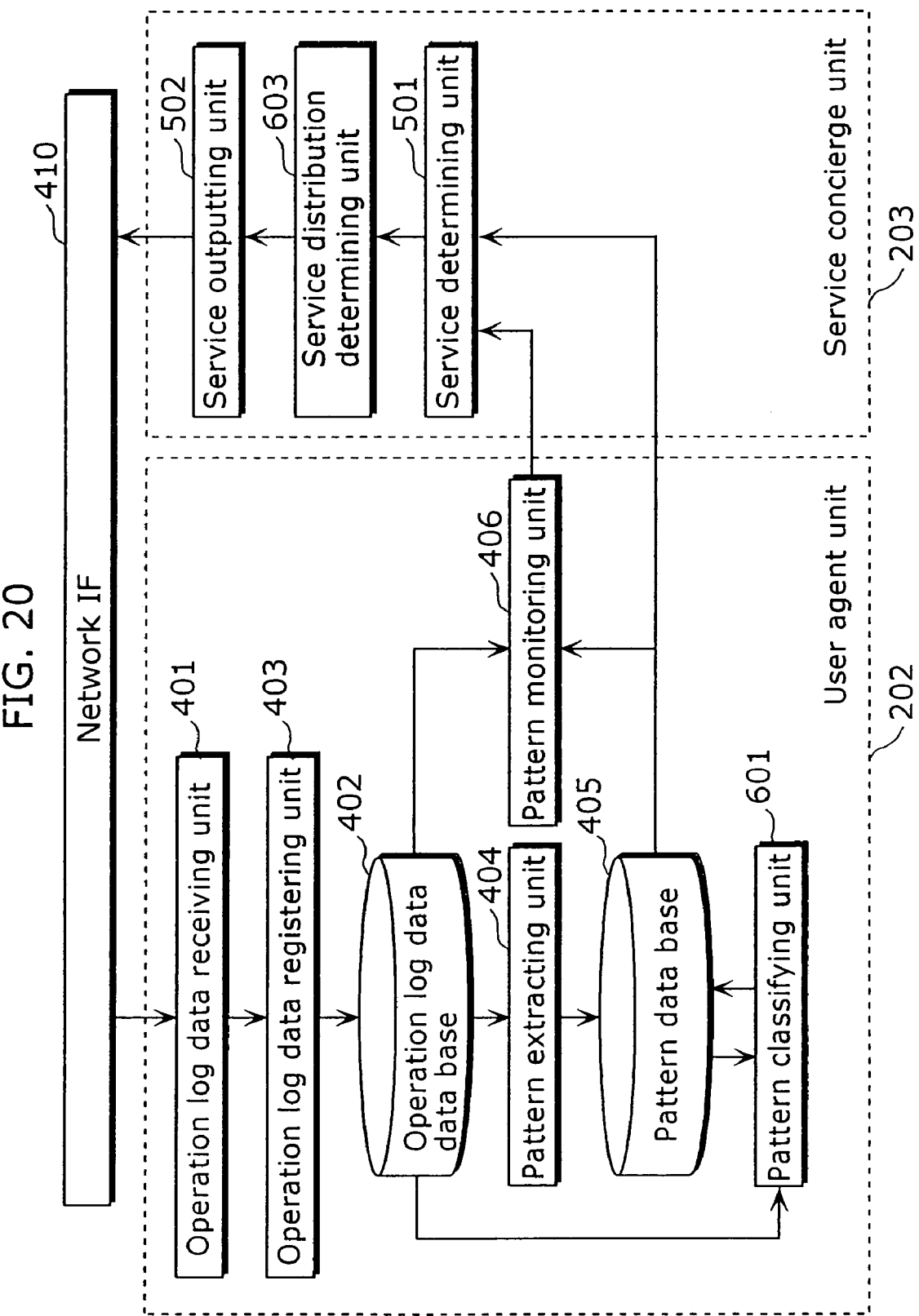
FIG. 20 is a block diagram showing the structure of the operation log data management system according to the fourth embodiment of the present invention.

FIG. 20 is a block diagram showing the structure of the operation log data management system according to the fourth embodiment. Such operation log data management system as described above comprises a service distribution determining unit 603 in place of the service priority determining unit 602 included in the structure according to the third embodiment, and the rest of the structure is the same as the third embodiment. The same parts as the third embodiment are provided with the same codes, and the explanation will be omitted here.

The service distribution determining unit 603 probabilistically distributes a service to be provided, in the case where it is impossible to simultaneously provide all of the services provided by the service determining unit 501. Also, for the service distribution determining unit 603, distribution probability is defined for each user and each operation in advance. FIG. 21 is a diagram showing an example of the defined distribution probability. FIG. 21A is a diagram showing the distribution probability for each user; and FIG. 21B is a diagram showing the distribution probability for each operation.

Next, in the operation log data management system structured as described above, the performance after the service to be provided to a user is estimated by the service determining unit 501 will be explained.

Figure 22:
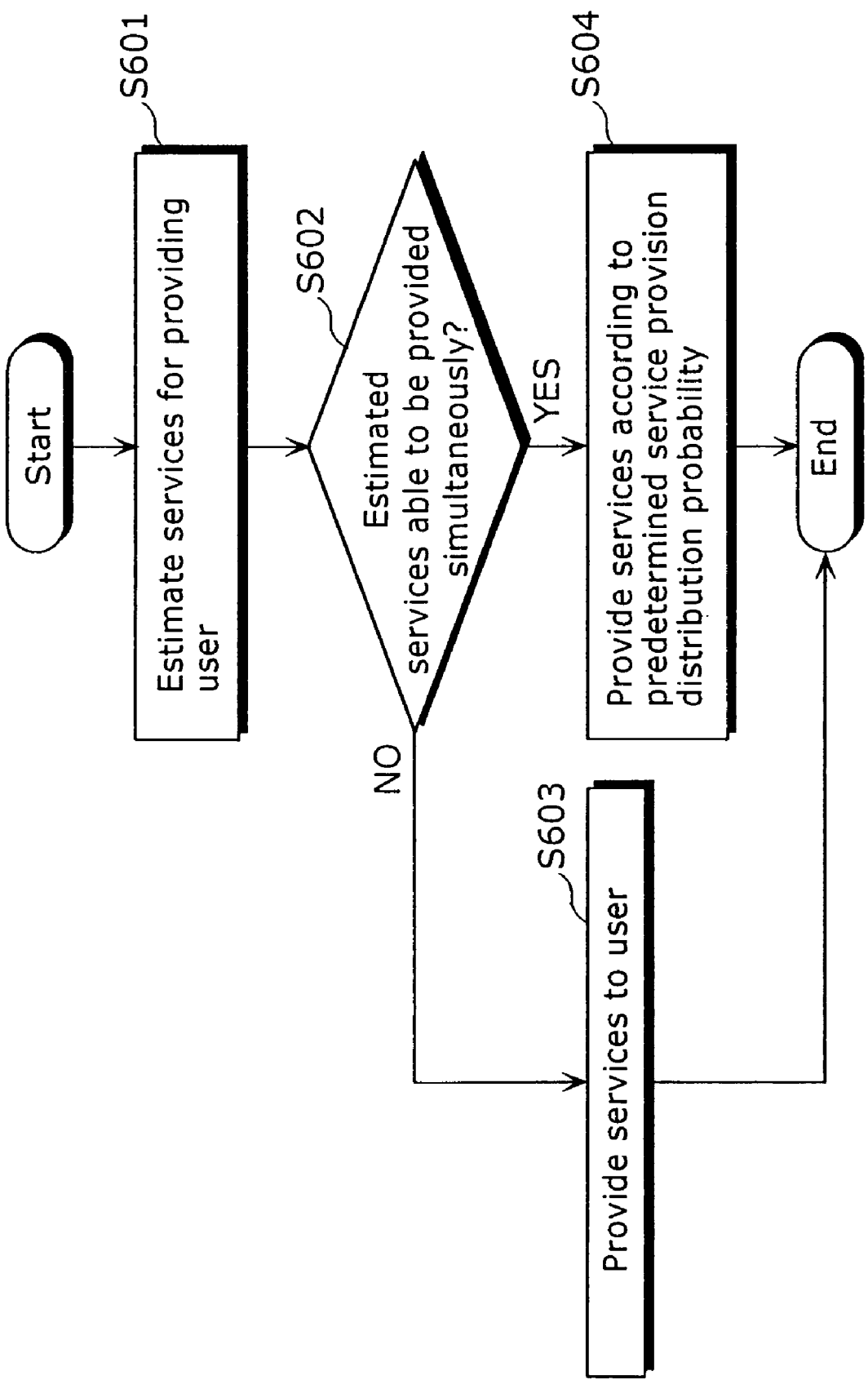
FIG. 22 is a flow chart showing the flow of operations in the case of providing an estimated service according to the fourth embodiment.

FIG. 22 is a flow chart showing the flow of operations in the case of providing the estimated service.

The service determining unit 501, using the frequent operation pattern memorized in the pattern data base 405, predicts the next operation of the user from the operation sequence currently being received, and accordingly estimates the service to be provided, such as device control and information provision (step S601). Next, the service distribution determining unit 603 confirms how many kinds of services estimated by the service determining unit 501 exist, and judges whether or not it is possible to simultaneously provide such services as described above (step S602). Here, in the case where it is possible to simultaneously provide the services estimated by the service determining unit 501, the service distribution determining unit 603 informs it to the service outputting unit 502. Then, the service outputting unit 502 provides the services estimated by the service determining unit 501 (step S603).

On the other hand, in the case where it is impossible to simultaneously provide the services estimated by the service determining unit 501, the service distribution determining unit 603, based on the distribution probability that is defined in advance as shown in FIG. 21, selects a service among the services estimated by the service determining unit 501, and informs the selected service to the service outputting unit 502. Then, the service outputting unit 502 provides the service selected by the service distribution determining unit 603 (step S604).

For example, as well as the third embodiment, suppose that the relation between the frequent operation pattern and the operator as shown in FIG. 10 is extracted. Here, in the case where the operation log data receiving unit 401 receives, "PowerOn, Opr1", as well as the third embodiment, the service determining unit 501 estimates the next predicted operation of "Opr4" as the service to be provided. In such example as described above, since there is only one kind of estimated service, the service distribution determining unit 603 informs the service outputting unit 502 of the fact that it is possible to provide the operation of "Opr4" estimated by the service determining unit 501. The service outputting unit 502 outputs the device control according to the operation of "Opr4" as service.

Also, as another example, for example, in the case where the operation log data receiving unit 401 receives, "Opr8, Opr2", as well as the third embodiment, as the next predicted operations, there are two kinds of operations, "Opr3" and "Opr5". Here, the service distribution determining unit 603 judges whether or not the operations of "Opr3" and "Opr5" can be simultaneously provided.

In the case where such operations as described above are the operations for different devices, the service distribution determining unit 603 informs the service outputting unit 502 of the fact that it is possible to provide the operations of "Opr3" and "Opr5" estimated by the service determining unit

501. The service outputting unit 502 outputs the device control, as a service, according to the operations of "Opr3" and "Opr5".

On the other hand, in the case where the above mentioned operations of "Opr3" and "Opr5" are the operations for the same device, as well as the third embodiment, since the operation of "Opr3" is estimated from the No. 3 frequent operation pattern, the operator is estimated as the user B. And, since the operation of "Opr5" is estimated from the No. 6 frequent operation pattern, the operator is estimated as the user A. Here, according to the distribution probability as shown in FIG. 21A, the distribution probability of the user A is "0.2", and the distribution probability of the user B is "0.1". Thus, the service distribution determining unit 603 determines which service to be provided, according to such probability ratio as "2:1". In other words, in such case as described above, the service is determined to provide the user A's operation of "Opr5" twice out of three times, and the user B's operation of "Opr3" once out of three times. Then, the service outputting unit 502 outputs the device control, as a service, associated with the operation selected by the service distribution determining unit 603. In the performance to determine one service using the above mentioned ratio of "2:1", for example, by generating random number (for example, 0.000-0.999), in the case of "0.000-0.666", the user A can be determined, and in the case of "0.667-0.999", the user B can be determined.

As described above, according to the fourth embodiment, a plurality of candidates for a service to be provided exist. And, even in the case where it is impossible to simultaneously provide such plurality of services as described above, it is possible to select and provide appropriate service.

Thus, as well as the third embodiment, as a home where such situation is ordinary as a plurality of users exist in the same space, even in the situation where physical restrictions such as the same device and the same space exist, it is possible to provide as optimum services as possible for all the users who exist there.

According to the fourth embodiment, the service to be provided is determined based on the ratio of the distribution probability between the users. Moreover, the service to be provided may be switched in mid-course based on the ratio of the distribution probability between the users. For example, control can be performed so as to provide the operation of "Opr3" for two hours, and after that, the operation of "Opr5" for one hour.

Also, according to the fourth embodiment, the distribution probability is defined for each user and each operation in advance. Moreover, the distribution probability can be determined, for example, based on the log data such as the use record indicating the user's past use. Also, the distribution probability can be dynamically changed. The log data such as the use record of the user and the like that are used here can be the information estimating the operator using the method as explained in the first and second embodiments, and also the information obtained using the apparatus capable of specifying the operator such as a remote control with ID.

In addition, according to the fourth embodiment, the service to be provided is determined based on the distribution probability between the users as shown in FIG. 21A. However, the service to be provided can be determined based on, for example, the distribution probability between the operations as shown in FIG. 21B.

Furthermore, according to the fourth embodiment, as shown in FIG. 20, the structure comprising the user agent unit 202 and the service concierge unit 203 is used. However, as a system structure, as long as the service concierge unit 203 is included, the functions of the user agent unit 202 such as the extraction management of frequent operation pattern and the operator estimation may exist outside of the system where communication is possible.

Fifth Embodiment

Figure 23:
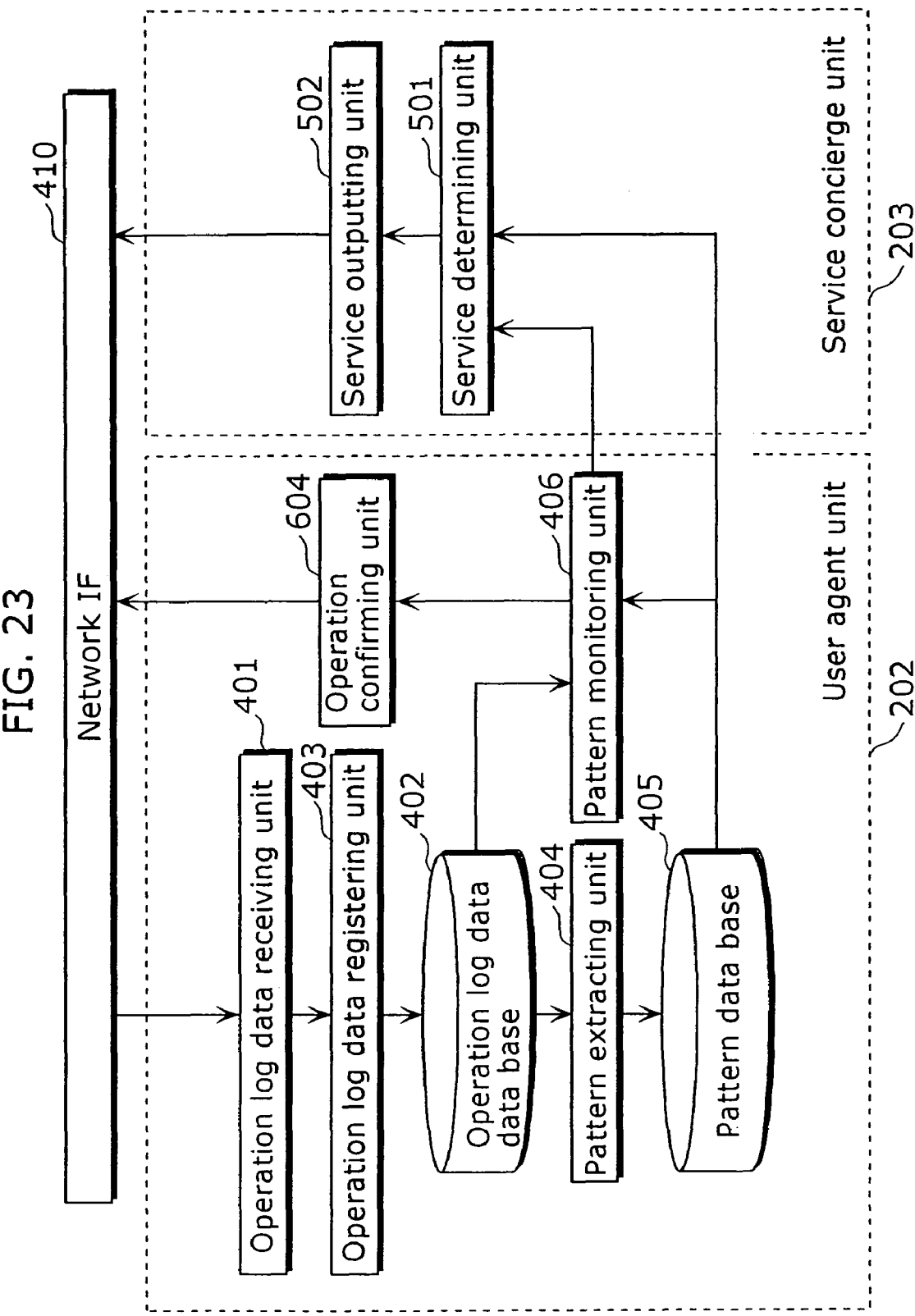
FIG. 23 is a block diagram showing the structure of the operation log data management system according to the fifth embodiment of the present invention.

FIG. 23 is a block diagram showing the structure of the operation log data management system according to the fifth embodiment of the present invention. Such operation log data management system as described above comprises operation confirming unit 604 in place of the pattern classifying unit 601 included in the structure of the first embodiment, and the rest of the structure is the same as the first embodiment. According to the fifth embodiment, the frequent operation pattern is extracted from the received operation log data of the user, and memorized in the pattern data base 405. The above mentioned extraction method for the frequent operation pattern is the same as the first embodiment, and the explanation will be omitted here.

The operation confirming unit 604 confirms and corrects the operation predicted as the operation that the user does not intend.

Next, the operations of the operation log data management system structured as described above will be explained.

Figure 24:
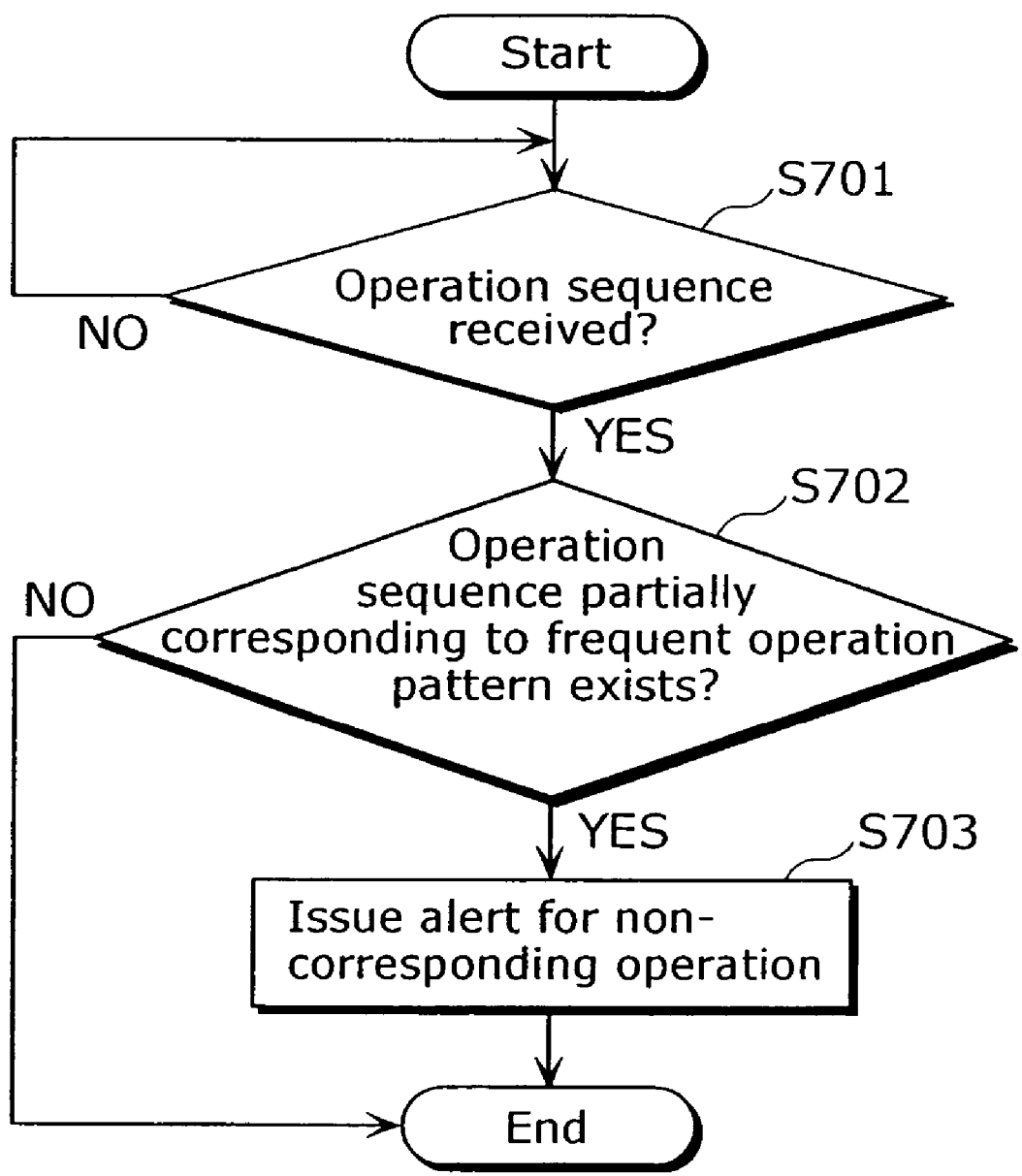
FIG. 24 is a flow chart showing the flow of operations in the case of receiving the operation log data according to the fifth embodiment.

FIG. 24 is a flow chart showing the flow of operations in the case of receiving the operation log data.

The operation log data receiving unit 401 confirms whether or not the operation log data sequence is received (step S701). Here, in the case where the operation log data is not received, the operation log data receiving unit 401 continues, in a predetermined cycle, confirming whether or not the operation log data is received. On the other hand, in the case where the operation log data is received, the operation log data receiving unit 401 informs the operation log data registering unit 403 of the fact that the operation log data is received. The operation log data registering unit 403 takes out the operation log data received by the operation log data receiving unit 401, and registers in the operation log data data base 402. Here, the pattern monitoring unit 406 compares whether or not the operation sequence of the registered operation log data corresponds with the frequent operation pattern memorized in the pattern data base 405 (step S702).

For example, suppose when the frequent operation patterns as shown in FIG. 7 are memorized in the pattern data base 405, the operation log data receiving unit 401 receives the operation log data, "Opr7, Opr6, Opr9". In such case as described above, the received operation log data partially corresponds with the No. 4 frequent operation pattern as shown in FIG. 7, in the part, "Opr7, Opr6", and the third operation differs. In such case as described above, the received operation log data partially corresponds with the frequent operation pattern.

As a result of such comparison as described above, in the case where the received operation log data completely corresponds with the frequent operation pattern, or does not correspond at all, the pattern monitoring unit 406 finishes the process. On the other hand, in the case where the received operation log data partially corresponds with the frequent operation pattern, the operation confirming unit 604 issues an alert for the user who is the operator or the device on which the operation has been performed, concerning the non-corresponding operation, among the received operation log data and frequent operation pattern that partially correspond with each other (step S703).

In such example as described above, among the received operation log data, the operation of "Opr9" is a different operation from the frequent operation pattern. Thus, the operation confirming unit 604 outputs a direction, concerning the operation of "Opr9", to display an alert such as "the operation of Opr9 has been performed now, so confirm whether the current operation is correct" to the display interface of the device on which the operation has been performed. Here, such output can be performed not only to the device on which the operation has been performed, but also to another device including a display unit such as a TV. Also, such alert is not limited to the display, but also other means such as alerting sound and vibration.

Such performance as described above is conducted from the following two aspects. The first aspect is that since the frequent operation pattern is a typical sequence of the operation observed many times, for the operation sequence partially differing from the frequent operation pattern, there is a high possibility that such "different" operation is a user's error operation or unintended operation. The second aspect is that in the case where the pattern data base 405 is appropriately updated to utilize for service prediction based on the frequent operation pattern, it is necessary to exclude as many user's unintended operations as possible and register.

According to the fifth embodiment, among the received operation log data and frequent operation pattern partially corresponding with each other, the non-corresponding operation, that is, the operation predicted as an error operation (the operation of "Opr9" in such example as described above) is performed (FIG. 25, performance 1). However, such operation as described above can be aborted (FIG. 25, operation 3). For example, suppose that the operation of "Opr9" is the operation such as "raise the volume", the operation confirming unit 604 outputs a control order to lower the once raised volume to the original volume level. In the case where the operation, "raise the volume", is the user's intended operation, even if the volume is automatically raised by the operation confirming unit 604, the operation to raise the volume again is performed. Thus, whether the user intended the operation can be judged more clearly.

Also, the operation confirming unit 604 may abort the performance predicted as an error operation, in place of such alert as described above, and perform the operation memorized in the pattern data base 405 (FIG. 25, performance 2). In such case as described above, for example, in the above mentioned example, the operation of "Opr9" is aborted, and the operation of "Opr10" is performed from the No. 4 frequent operation pattern as shown in FIG. 7.

As described above, according to the fifth embodiment, the operation partially deviating from the frequent operation pattern is detected; an alert concerning the operation is issued to the operator; the operation is aborted; an alternate operation predicted from the frequent operation pattern is performed, and the like. Thereby, it is possible to prevent an error operation of the operator or unintended operation. Thus, it is possible to enhance the credibility of the log data information that is important in the case of utilizing for services by analyzing the user's preference or state, based on the log data.

Furthermore, according to the fifth embodiment, as shown in FIG. 23, the structure comprising the user agent unit 202 and the service concierge unit 203 is used. However, as a system structure, as long as the user agent unit 202 is included, it is sufficient.

Sixth Embodiment

The sixth embodiment is an example of extracting a frequent operation pattern from the operation log data of a plurality of devices connected via a network and providing a service based on the extracted frequent operation pattern.

Figure 26:
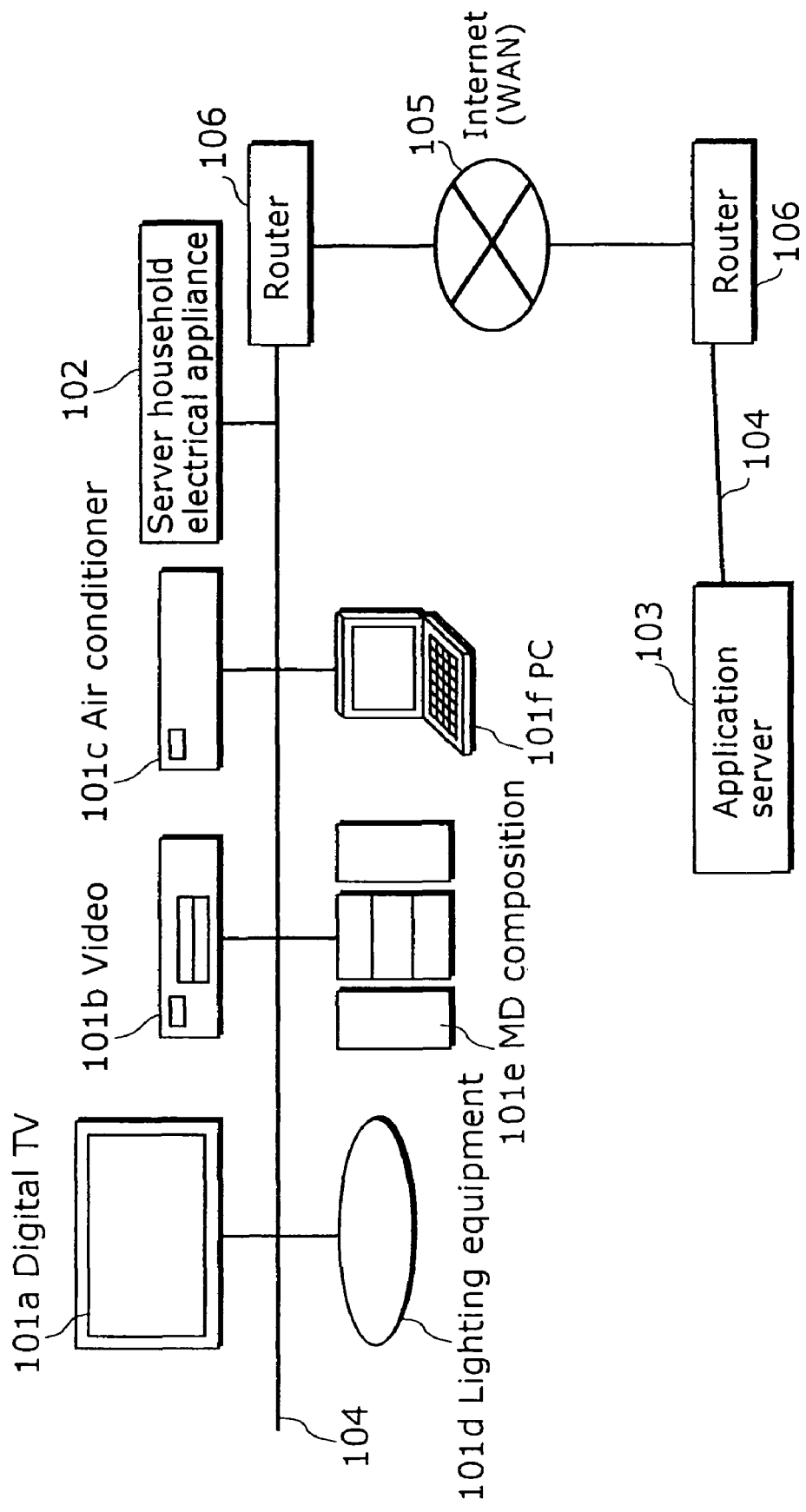
FIG. 26 is a schematic diagram showing the overall structure of the operation log data management system according to the sixth embodiment of the present invention.

FIG. 26 is a block diagram showing an overall structure of the operation log data management system according to the sixth embodiment of the present invention.

The operation log data management system, as shown in FIG. 26, comprises: terminal household electrical appliances 101 such as a digital TV (hereinafter referred to simply as a television or a TV) 101a, a video 101b, an air conditioner 10c, a lighting equipment 101d, an MD composition 101e and a Personal Computer (PC) 101f; server household electrical appliances (user server) 102 such as a home server and a home gateway; an application server 103 whose access to the server household electrical appliances 102 is permitted; a Local Area Network (LAN) 104 formed by a wired network or a wireless network; a Wide Area Network (WAN: for example, the Internet) 105; and a router 106 for connecting the LAN 104 with the WAN 105.

Here, the server household electrical appliances 102 are always energized, and according to the predetermined conditions, access from the WAN 105 side is permitted. Also, FIG. 26 shows one of the plurality of application servers 103 that respectively provide information service. In addition, the router 106 has a modem function for corresponding, if necessary, such as the case where Asymmetric Digital Subscriber Line (ADSL) or Fiber To The Home (FTTH) is used for the access to the WAN 105.

Figure 27:
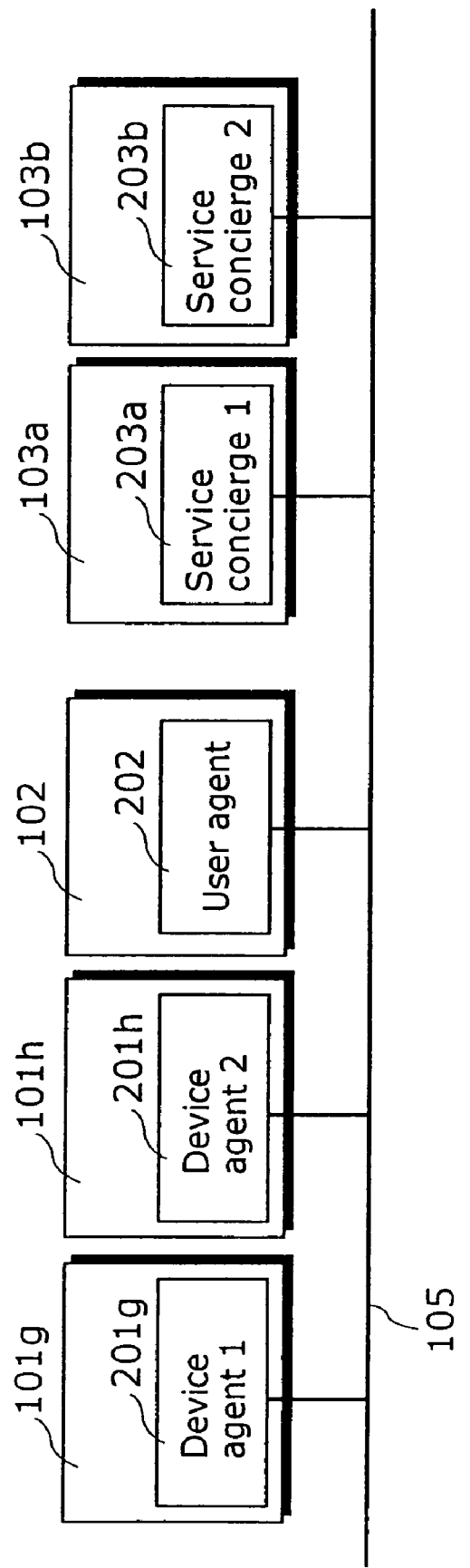
FIG. 27 is a block diagram showing the arrangement of main functional modules forming the system according to the sixth embodiment.

FIG. 27 is a block diagram showing main function modules (programs) contained in the terminal household electrical appliances 101, the server household electrical appliances 102 and the application server 103 as shown in FIG. 26.

Each of the terminal household electrical appliances 101 includes a device agent 201 that records device operation log data, using the user's operation as trigger. The server household electrical appliance 102 includes a user agent 202 that receives and consolidates the device operation log data transmitted from the device agent 201 with a predetermined timing. Each of the application servers 103 includes a service concierge 203 that provides a service using the device operation log data provided by the user agent 202.

Also, the server household electrical appliance 102, in the case of a home server including a recording function, may include its own device agent 201, in addition to the user agent 202. Moreover, in the case where a plurality of household electrical appliances to be the candidate for the server household electrical appliance 102 exist, one appliance is selected by a predetermined method.

Figure 28:
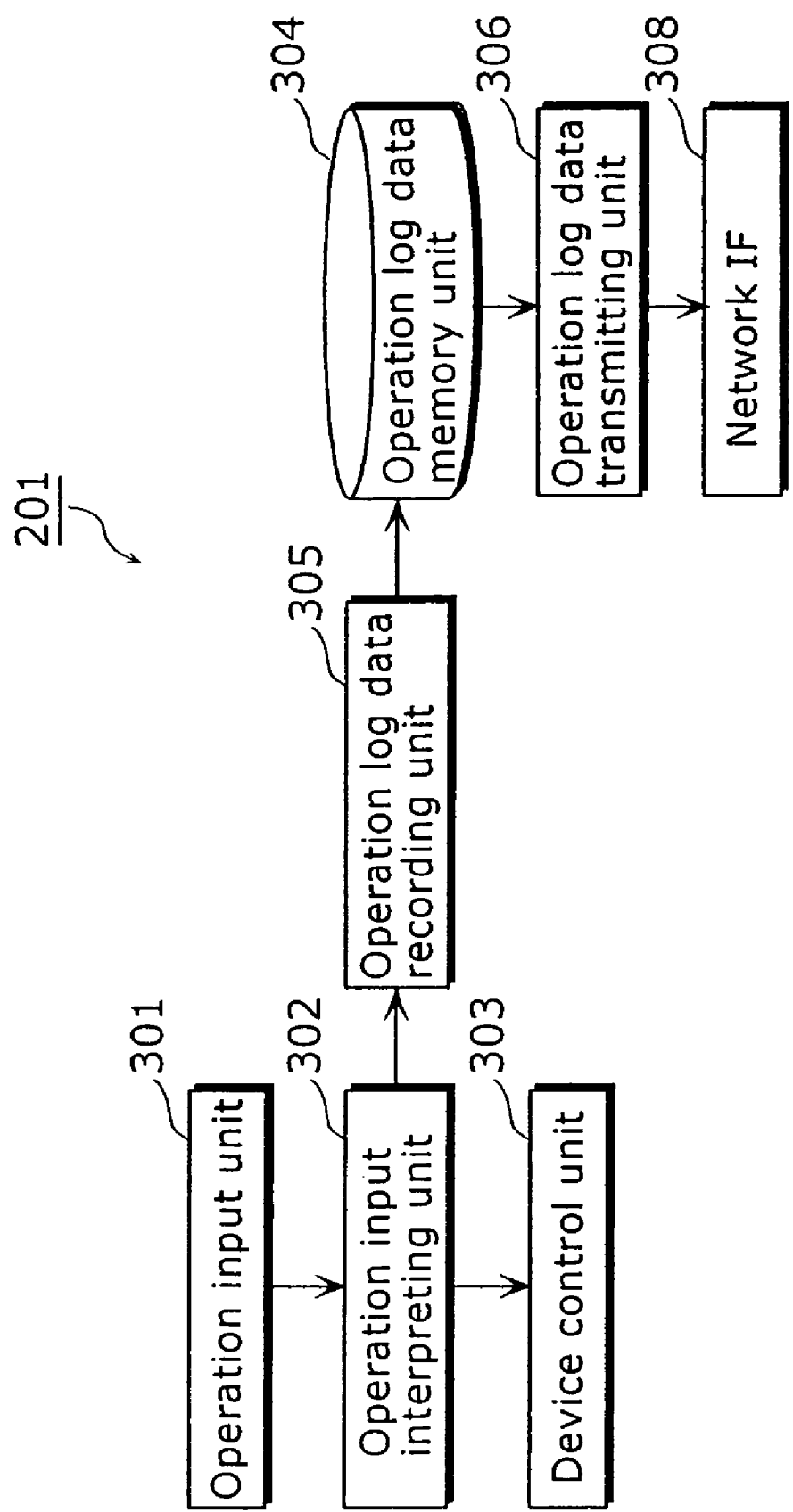
FIG. 28 is a block diagram showing the structure of the device agent according to the sixth embodiment.

FIG. 28 is a block diagram showing the structure of the device agent 201.

The device agent 201 includes: an operation input unit 301; an operation input interpreting unit 302; a device control unit 303; an operation log data memory unit 304; an operation log data recording unit 305; an operation log data transmitting unit 306; and a network IF (network interface) 308.

The operation input unit 301 receives the user's operation inputted via a remote control and the like. The operation input interpreting unit 302 interprets the operation input from the operation input unit 301, and determines the performance state of the device. The device control unit 303 controls the device corresponding to the analysis result of the operation input analysis unit 302. The operation log data memory unit 304 memorizes the device operation, pairing the operation date and the operation content. The operation log data recording unit 305 adds the device operation interpreted by the operation input interpreting unit 302 to the operation log data memory unit 304. The operation log data transmitting unit 306 transmits the operation log data memorized by the operation log data memory unit 304 to the user agent 202, with a predetermined timing, via the network IF 308.

Next, the performance of the device agent 201 structured as described above will be explained.

First, the device agent 201 interprets, using the operation input interpreting unit 302, the operation received by the operation input unit 301 from the remote control operated by the user. For example, it is interpreted that since the temperature setting of the air conditioner 101c is 25 degrees, and the user pushed the setting temperature up button of the remote control twice, the temperature setting is set as 27 degrees. Also, the input operation by other operators than the remote control is processed in the same manner. Thus, the device control unit 303 executes the performance corresponding to the operation input. At the same time, the operation log data transmitting unit 306 records the operation log data in the operation log data memory unit 304.

FIG. 29 is a diagram showing an example of the operation log data that should be saved in the log data defined for each device. For example, the case of an air conditioner indicates that as operation types, "PowerOn", "PowerOff", temperature setting, air volume setting, stop, reserve and the like are the subjects to be saved as the operation log data.

FIG. 30 is a diagram showing an example of the operation log data. The operation log data as shown in FIG. 30A is an example of the operation lodata of an air conditioner. As the operation date, the date when the operation is performed is written. As the device type, "Air Conditioner" is written. As the operation type identifier, "Set" as shown in FIG. 29 is written. As the argument, "27" is written. Thereby, it indicates that the air conditioner is operated at the temperature of 27 degrees on the operation date. Also, the operation log data as shown in FIG. 30B is an example of the TV operation log data, and indicates that on the operation date the program whose ID number is uniquely specified as XXXXXXX is viewed. Moreover, the log data starting date memory unit can be set. The starting date of operating at 25 degrees is memorized in advance. The present date is set as the ending date of operating at 25 degrees. And, the operation starting date and the operation ending date can be recorded by the operation log data memory unit 304. In such case as described above, the present date is memorized, as the starting date of operating at 27 degrees, by the log data starting date memory unit. Here, the entry for the operation ending date may be the elapsed time from the operation starting date.

As described above, the operation log data recorded by the operation log data memory unit 304 is transmitted for the user agent 202, via the network IF308 and the network, by the operation log data transmitting unit 306.

FIG. 31 is a diagram showing an example of the operation log data received by the user agent 202.

The operation log data received by the user agent 202 comprises, for example, as shown in FIG. 31, operation date, device type, operation type identifier and argument. The log data of various devices and various operations is arranged in chronological order, and memorized by the operation log data data base 402.

It is possible to generate episode data as shown in FIG. 32, and further extract frequent operation patterns as shown in FIG. 33, out of such operation log data as described above, according to the procedure as shown in FIG. 5 that is already explained in the first embodiment.

Also, with the user agent 202 and the service concierge 203 included in the structure as shown in FIG. 1 according to the first embodiment, by using the operation procedure as shown in FIG. 5 and FIG. 9, the frequent operation pattern of the operation log data can be extracted. And, without using a particular means for user identification, by using the operation log data and the deterministic operation information as shown in FIG. 34, it is possible to estimate which user performs the operation. Moreover, it is possible to provide service such as device control and information provision based on the operation prediction which utilizes the frequent operation pattern that is provided with the information concerning such operators as described above.

Also, with the user agent 202 and the service concierge 203 included in the structure as shown in FIG. 14 according to the second embodiment, by using the operation procedures as shown in FIG. 16, the frequent operation pattern of the operation log data can be extracted. And, without using a particular means for user identification, by using the operation log data and the deterministic operation information, it is possible to estimate which user performs the operation. Moreover, it is possible to provide services such as device control and information provision based on the operation prediction which utilizes the frequent operation pattern that is provided with the information concerning such operator as described above.

In addition, with the user agent 202 and the service concierge 203 included in the structure as shown in FIG. 17 according to the third embodiment, by using the operation procedures as shown in FIG. 19, the frequent operation pattern of the operation log data can be extracted. Even in the case where a plurality of services that cannot be simultaneously provided are predicted, based on the defined priority degree for each user and each operation, it is possible to determine and provide services such as device control and information provision, based on the operation prediction.

Moreover, with the user agent 202 and the service concierge 203 included in the structure as shown in FIG. 20 according to the fourth embodiment, by using the operation procedures as shown in FIG. 22, the frequent operation pattern of the operation log data can be extracted. Even in the case where a plurality of services that cannot be simultaneously provided are predicted, based on the predetermined probability distribution for each user and each operation, it is possible to determine and provide services such as device control and information provision, based on the operation prediction.

Furthermore, with the user agent 202 and the service concierge 203 included in the structure as shown in FIG. 23 according to the fifth embodiment, by using the operation procedures as shown in FIG. 24, the frequent operation pattern of the operation log data can be extracted. And, by issuing an alert to the operator and aborting the operation for the operation that partially deviates from the frequent operation pattern, or performing the alternate operation predicted from the frequent operation pattern, it is possible to prevent the operator's error operation or unintended operation.

Figure 35:
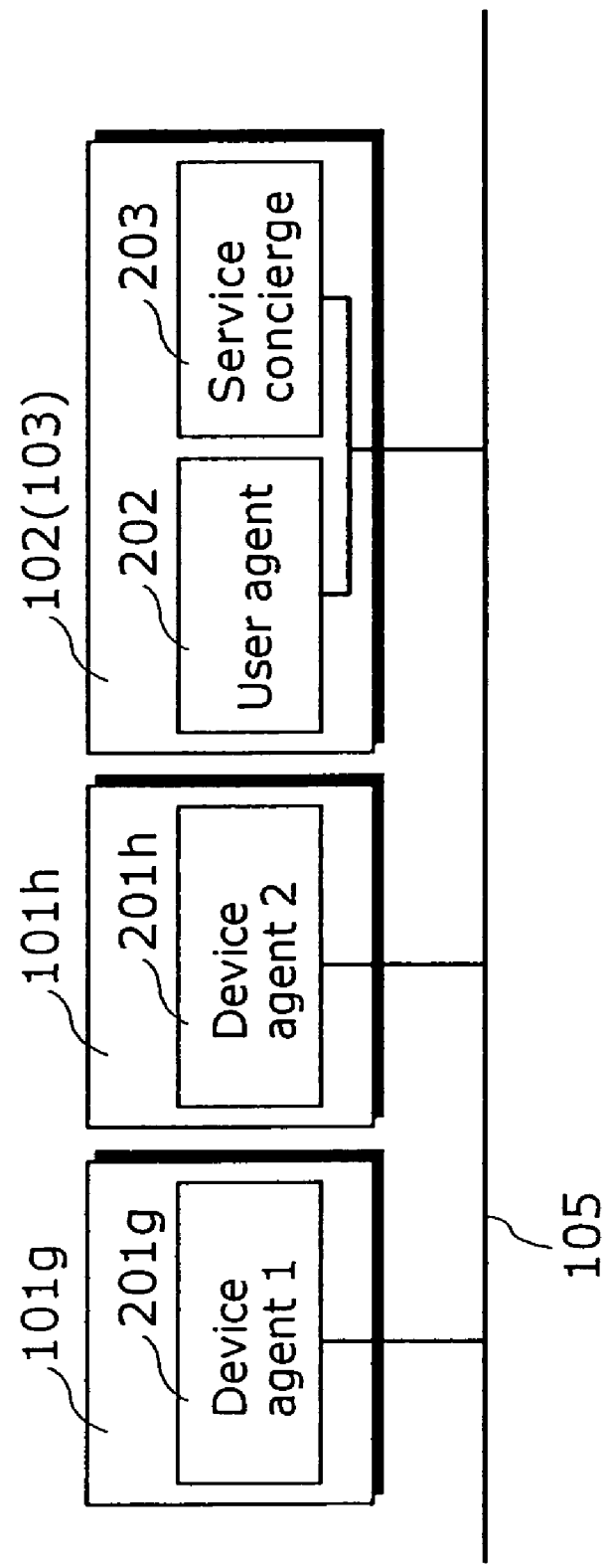
FIG. 35 is a block diagram showing another structure of the operation log data management system according to the sixth embodiment.

According to the sixth embodiment, the structure where the user agent 202 and the service concierge 203 are independent as shown in FIG. 27 is used. However, the structure is not limited to this. For example, as shown in FIG. 35, the structure where the user agent 202 and the service concierge 203 are separated at the functional level, but such functions are included in the same apparatus may be used.

Also, according to the sixth embodiment, an example of the device used at home as the terminal household electrical appliance 101 is raised. However, the device is not limited to this. As long as information can be collected by connecting to the network, for example, a device contained in the car and the like, a Personal Digital Assistance (PDA), a cellular phone and the like may be used.

In addition, each embodiment as described above cannot only be implemented individually, but also be implemented in combination with the other embodiments, for example, by combining the first embodiment and the third embodiment.

Moreover, in the case where only one terminal household electrical appliance 101 exists according to each embodiment as described above, the apparatus can be implemented by including both the device agent 201 and the user agent 202 in the terminal household electrical appliance 101, or by further adding the service concierge 203 to the above mentioned device agent 201 and user agent 202.

As evident from such explanation as described above, according to the operation log data management system of the present invention, the operation log data of individual device is collected and consolidated. And, it is possible to provide a service associated with the situation or reflecting characteristics of each individual life.

Thus, a service is provided associated with the situation by using information that is analysis of the user's preference or state based on various log data information. Such context aware service as described above is needed today, and its practical value is extremely high.

The present invention can be used as the operation log data management system comprising the communication system in which each device, user server apparatus and application server apparatus are connected via the transmission path, in particular, as the operation log data management system comprising the communication system and the like that include: the terminal household electrical appliances such as a digital TV, a video, an air conditioner, a lighting equipment, an MD composition and a PC; the server household electrical appliances such as a home server and a home gateway; and the application server apparatus such as a computer.

The invention claimed is:

1. An operation log data management system comprising: (i) at least one device, (ii) an operation log data management apparatus which manages operation log data transmitted from said at least one device, and (iii) a service providing apparatus which determines a service associated with a user's behavior based on the operation log data managed by said operation log data management apparatus and provides the determined service to said at least one device, which is connected to other devices in the operation log data management system, wherein said operation log data management apparatus includes:

a communication interface unit that receives the operation log data from said at least one device via a communication network;

a pattern extracting unit that extracts using a hardware processor frequent operation patterns which are each an operation sequence from the operation log data received by said communication interface unit;

a pattern database into which frequent operation patterns extracted by said pattern extracting unit are accumulated;

a pattern classifying unit that includes a non-transitory memory that holds a definitive operation table in which each frequent operation pattern is associated with an operator of each operation included in the frequent operation pattern, and (i) specifies the operator of the frequent operation pattern based on characteristics of the frequent operation pattern per se by referring to the definitive operation table for each frequent operation pattern accumulated in said pattern database, and (ii) registers the specified operator in said pattern database in association with the frequent operation pattern; and a pattern monitoring unit that monitors whether or not an operation sequence of operation log data newly transmitted by said at least one device corresponds with one of the frequent operation patterns accumulated in said pattern database, said service providing apparatus includes:

a service determining unit that (i) recognizes that the operator of the operation log data is the operator associated with the frequent operation pattern, in the case where it is determined, as the monitoring result by said pattern monitoring unit, that the operation sequence of the operation log data newly transmitted by said at least one device corresponds with the one of the frequent operation patterns accumulated in said pattern database, and (ii) determines to provide the recognized operator with a service according to the frequent operation pattern; and a communication interface unit that provides the service determined by said service determining unit via the communication network, the definitive operation table held by said non-transitory memory associates, for each of operators, an operator with a definitive operation that is a unique operation performed by the operator, the definitive operation is an operation which makes it possible to determine that the operator of the definitive operation is always a specific user, and said pattern classifying unit (i) determines whether or not each frequent operation pattern accumulated in said pattern database includes a definitive operation registered in the definitive operation table, (ii) specifies, when it is determined that the definitive operation is included, an operator who corresponds to the included definitive operation and is registered in the definitive operation table, and (iii) registers the specified operator in said pattern database in association with the frequent operation pattern.

2. The operation log data management system according to claim 1, wherein said pattern classifying unit specifies a first frequent operation pattern as the operation performed by the operator associated with the deterministic operation, the first frequent operation pattern being a frequent operation pattern including a deterministic operation associated with a predetermined operator, in the frequent operation pattern.

3. The operation log data management system according to claim 2, wherein said pattern classifying unit specifies an operator of a second frequent operation pattern which is a frequent operation pattern other than the first frequent operation pattern, in the frequent operation pattern, based on a statistic frequency of chain occurrence for the first frequent operation pattern obtained from the operation log data transmitted by said at least one device in the past.

4. The operation log data management system according to claim 1, wherein said pattern classifying unit specifies a first frequent operation pattern as the operation performed by the operator associated with the deterministic operation, the first frequent operation pattern being a frequent operation pattern including a deterministic operation associated with a predetermined operator, in the frequent operation pattern included in the operation log data newly transmitted by said at least one device.

5. The operation log data management system according to claim 4, wherein said pattern classifying unit specifies an operator of a second frequent operation pattern which is a frequent operation pattern other than the first frequent operation pattern, in the frequent operation pattern included in the operation log data newly transmitted, based on a degree of adjacency between the first frequent operation pattern and the second frequent operation pattern occurring after the first frequent operation pattern.

6. The operation log data management system according to claim 1,
wherein the definitive operation table further holds a certainty factor of the operator associated with the frequent operation pattern for each operation included in the frequent operation pattern, and
said service determining unit recognizes the operation of the frequent operation pattern according to the certainty factor, when different operators are associated with the frequent operation pattern.

7. An operation log data management apparatus which manages operation log data transmitted by at least one device, the apparatus comprising:
a communication interface unit that receives the operation log data from the at least one device via a communication network;
a pattern extracting unit that extracts using a hardware processor frequent operation patterns which are each an operation sequence from the operation log data received by said communication interface unit;
a pattern database into which the frequent operation patterns extracted by said pattern extracting unit are accumulated;
a pattern classifying unit that includes a non-transitory memory that holds a definitive operation table in which each frequent operation pattern is associated with an operator of each operation included in the frequent operation pattern, and (i) specifies the operator of the frequent operation pattern based on characteristics of the frequent operation pattern per se by referring to the definitive operation table for each frequent operation pattern accumulated in said pattern database, and (ii) registers the specified operator in said pattern database in association with the frequent operation pattern; and
a pattern monitoring unit that monitors whether or not an operation sequence of operation log data newly transmitted by the at least one device corresponds with one of the frequent operation patterns accumulated in said pattern database,
the definitive operation table held by said non-transitory memory associates, for each of operators, an operator with a definitive operation that is a unique operation performed by the operator,
the definitive operation is an operation which makes it possible to determine that the operator of the definitive operation is always a specific user, and
said pattern classifying unit (i) determines whether or not each frequent operation pattern accumulated in said pattern database includes a definitive operation registered in the definitive operation table, (ii) specifies, when it is determined that the definitive operation is included, an operator who corresponds to the included definitive operation and is registered in the definitive operation table, and (iii) registers the specified operator in said pattern database in association with the frequent operation pattern.

8. An operation log data management method for managing operation log data transmitted by at least one device, the method comprising:
receiving using a communication interface the operation log data from the at least one device via a communication network;
a pattern extracting step of extracting using an extracting unit including a hardware processor frequent operation patterns which are each an operation sequence from the operation log data received by a communication interface unit;
a pattern accumulating step for accumulating in a pattern database the frequent operation patterns extracted by the pattern extracting unit;
a pattern classifying step of (i) holding in a non-transitory memory a definitive operation table in which each frequent operation pattern is associated with an operator of each operation included in the frequent operation pattern, (ii) specifying the operator of the frequent operation pattern based on characteristics of the frequent operation pattern per se by referring to the definitive operation table for each frequent operation pattern accumulated in the pattern database, and (iii) registering the specified operator in the pattern database in association with the frequent operation pattern; and
a pattern monitoring step of monitoring whether or not an operation sequence of operation log data newly transmitted by said at least one device corresponds with the frequent operation pattern, .
the definitive operation table held in the non-transitory memory by said pattern classifying step associates, for each of operators, an operator with a definitive operation that is a unique operation performed by the operator,
the definitive operation is an operation which makes it possible to determine that the operator of the definitive operation is always a specific user, and
said pattern classifying step (i) determines whether or not each frequent operation pattern accumulated in said pattern database includes a definitive operation registered in the definitive operation table, (ii) specifies, when it is determined that the definitive operation is included, an operator who corresponds to the included definitive operation and is registered in the definitive operation table, and (iii) registers the specified operator in said pattern database in association with the frequent operation pattern.

9. A program stored on a non-transitory computer-readable recording medium for managing operation log data transmitted from at least one device, and causing a computer to execute the steps included in the operation log data management method according to claim 8.

* * * * *